(12) United States Patent
Nakayama

(10) Patent No.: US 7,223,911 B2
(45) Date of Patent: May 29, 2007

(54) PORTABLE TELEPHONE SET WITH REPRODUCING AND COMPOSING CAPABILITY OF MUSIC

(75) Inventor: Kazunori Nakayama, Tokyo (JP)

(73) Assignee: Yamaha Corporation, Shizuoka-Ken (JP)

( * ) Notice: Subject to any disclaimer, the term of this patent is extended or adjusted under 35 U.S.C. 154(b) by 166 days.

(21) Appl. No.: 10/279,464

(22) Filed: Oct. 24, 2002

(65) Prior Publication Data

US 2003/0079598 A1    May 1, 2003

(30) Foreign Application Priority Data

Oct. 29, 2001    (JP)    ............... 2001-330975
Oct. 29, 2001    (JP)    ............... 2001-330976

(51) Int. Cl.
    *G10H 7/00* (2006.01)
(52) U.S. Cl. .................. 84/602; 84/609; 84/610; 84/649; 84/650
(58) Field of Classification Search .......... 84/600–602, 84/609–611, 615, 645, 649–651
    See application file for complete search history.

(56) References Cited

U.S. PATENT DOCUMENTS

| | | | |
|---|---|---|---|
| 5,369,216 A | | 11/1994 | Miyamoto |
| 6,177,624 B1* | | 1/2001 | Takahashi et al. ............ 84/609 |
| 6,274,798 B1* | | 8/2001 | Suzuki et al. ................ 84/615 |
| 2001/0047717 A1* | | 12/2001 | Aoki et al. ................... 84/611 |
| 2003/0012361 A1 | | 1/2003 | Yoshimura |
| 2003/0089217 A1* | | 5/2003 | Suzuki ........................ 84/609 |
| 2003/0159564 A1* | | 8/2003 | Oren-Chazon ............ 84/477 R |
| 2003/0205125 A1* | | 11/2003 | Futamase et al. ............. 84/622 |
| 2004/0069124 A1* | | 4/2004 | Murakai et al. .............. 84/622 |

FOREIGN PATENT DOCUMENTS

| | | |
|---|---|---|
| EP | 1073034 A2 | 1/2001 |
| JP | 61-198299 | 9/1986 |
| JP | 04-234090 | 8/1992 |
| JP | 2001-195068 | 7/2001 |
| JP | 2001-249663 | 9/2001 |

OTHER PUBLICATIONS

Notice of Rejection issued on Mar. 22, 2005 by Japanese Patent Office regarding Japanese patent application No. 2001-330976.
Notice of Rejection issued on Mar. 22, 2005 by Japanese Patent Office regarding Japanese patent application No. 2001-330975.

* cited by examiner

*Primary Examiner*—Marlon Fletcher
(74) *Attorney, Agent, or Firm*—Harness, Dickey & Pierce, PLC

(57) ABSTRACT

A music apparatus is provided in a portable terminal set having a plurality of controls. In the music apparatus, a storage stores a plurality of performance patterns. An allocating section allocates the plurality of the performance patterns to the plurality of the controls. A reproducing section is responsive to operation of the controls for reproducing the performance patterns allocated to the operated controls. In case of creating music, a setting section is operated for setting timings of reproducing the performance patterns while operating the controls. A composing section operates based on the selecting of the performance patterns and the setting of the timings for composing a sequence of the performance patterns, the sequence being effective to enable the portable terminal set to sequentially reproduce the selected performance patterns at the set timings.

13 Claims, 12 Drawing Sheets

| PACK | SW1 | SW2 | SW3 | · · · · | SW12 |
|---|---|---|---|---|---|
| PACK NUMBER 3 | PATTERN NUMBER 1 | PATTERN NUMBER 2 | PATTERN NUMBER 3 | · · · · | PATTERN NUMBER 12 |

PORTABLE TELEPHONE SET WITH REPRODUCING AND COMPOSING CAPABILITY OF MUSIC

BACKGROUND OF THE INVENTION

1. Technical Field of the Invention

The present invention relates to a music reproducing apparatus in a portable terminal set such as a cellular phone and to a music reproducing program used for the portable terminal set.

2. Prior Art

Conventionally, there are provided portable terminal sets such as cellular phones capable of recording a plurality of music pieces called "ring melodies" and selecting any of these melodies for reproduction. In this case, the portable terminal's display lists music names. A user moves a cursor on the screen of the display to select a desired music.

Conventionally, there is provided other portable terminal sets such as a cellular phone capable of creating music piece data (ring melody) by entering musical notes one by one from a numeric keypad. However, such operation is painstaking and necessitates a long time to complete a single music piece, thereby often discouraging creating of a music piece.

Since the portable terminal's display screen is small, however, music names are displayed in small characters on the screen. In addition, just a small number of music names are displayed at a time. This causes inconvenience of finding an intended music with difficulty. Moreover, moving the cursor to an intended music is cumbersome. Actually, selecting intended music pieces is time-consuming.

SUMMARY OF THE INVENTION

The present invention has been made in consideration of the foregoing problems of the prior art. It is therefore an object of the present invention to provide a music reproducing apparatus and a program therefor capable of quickly changing music pieces reproduced on a portable terminal with easy operation and allowing a user to enjoy easily creating a multifarious music.

It is another object of the present invention to provide a portable terminal set with a music piece composing apparatus and a program therefor that can multifariously create a music piece with simple editing operations.

In one aspect of the invention, a music reproduction apparatus is provided in a portable terminal set having a plurality of controls manually operable for controlling the portable terminal set. The inventive music reproduction apparatus comprises a storage that stores a plurality of performance patterns, an allocating section that allocates the plurality of the performance patterns to the plurality of the controls, and a reproducing section responsive to operation of the controls for reproducing the performance patterns allocated to the operated controls.

Preferably, the storage is divided into blocks and selectably stores a multiple of packs in the respective blocks, each pack comprising a plurality of performance patterns, and wherein the allocating section allocates the performance patterns contained in the pack selected from the storage.

Preferably, the reproducing section reproduces the performance patterns in synchronization with a predetermined music timing, the performance patterns including a synchronous performance pattern which is reproduced at the music timing after an operating timing of the control allocated to the synchronous performance pattern, and an asynchronous performance pattern which is reproduced at an operating timing of the control allocated to the asynchronous performance pattern.

In another aspect of the invention, a music composition apparatus is provided in a portable terminal set having a plurality of controls manually operable for controlling the portable terminal set. The inventive music composition apparatus comprises a storage that stores a plurality of performance patterns, an allocating section that allocates the plurality of the performance patterns to the plurality of the controls, such that the controls can be operated for selecting the performance patterns, a setting section that is operated for setting timings of reproducing the performance patterns while operating the controls, and a composing section that operates based on the selecting of the performance patterns and the setting of the timings for composing a sequence of the performance patterns, the sequence being effective to enable the portable terminal set to sequentially reproduce the selected performance patterns at the set timings.

Preferably, the composing section composes the sequence of the performance patterns according to a predetermined music progression, such that the selected performance pattern is trimmed by the set timing and fitted into the music progression.

Preferably, the composing section composes the sequence of the performance patterns such that the selected performance pattern is reproduced form a top of the performance pattern at the set timing.

Preferably, the storage is divided into blocks and selectably stores a multiple of packs in the respective blocks, each pack comprising a plurality of performance patterns, and wherein the allocating section allocates the performance patterns contained in the pack selected from the storage such that the composing section composes the sequence of the performance patterns contained in the selected pack, the music composition apparatus further comprising a pack changing section that can change the selected pack to another pack such that the performance patterns of the selected pack involved in the composed sequence are replaced by corresponding performance patterns of said another pack while maintaining the settings of the timings.

In a further aspect of the invention, a music composition apparatus is provided in a portable terminal set which is associative with various information devices and which has a plurality of controls manually operable for controlling the portable terminal set. The inventive music composition apparatus comprises a storage that stores a plurality of performance patterns, an allocating section that allocates the plurality of the performance patterns to the plurality of the controls, such that the controls can be operated for selecting the performance patterns, a composing section that operates based on the selecting of the performance patterns for composing pattern sequence dada effective to enable the portable terminal set to sequentially reproduce the selected performance patterns at predetermined timings, and a converting section that converts the pattern sequence data into music data having a format common to the various information devices, such that the music data is transferable to the information device for reproduction of the selected performance patterns.

Preferably, the converting section attaches the music data with information effective to allow the information device a transfer of the music data to another information device.

Preferably, the converting section attaches the music data with information effective to inhibit alteration of the music data.

The invention includes a music reproduction method applicable to a portable terminal set having a plurality of controls manually operable to control the portable terminal set. The inventive method comprises the steps of storing a plurality of performance patterns in a storage, allocating the plurality of the performance patterns to the plurality of the controls, and responding to operation of the controls for reproducing the performance patterns allocated to the operated controls.

The invention also includes a music composition method applicable to a portable terminal set having a plurality of controls manually operable to control the portable terminal set. The inventive method comprises the steps of storing a plurality of performance patterns in a storage, allocating the plurality of the performance patterns to the plurality of the controls, such that the controls can be operated for selecting the performance patterns, setting timings of reproducing the performance patterns while operating the controls, and composing a sequence of the performance patterns based on the selecting of the performance patterns and the setting of the timings, the sequence being effective to enable the portable terminal set to sequentially reproduce the selected performance patterns at the set timings.

The invention moreover includes another music composition method applicable to a portable terminal set which is associative with various information devices and which has a plurality of controls manually operable to control the portable terminal set. The inventive method comprises the steps of storing a plurality of performance patterns in a storage, allocating the plurality of the performance patterns to the plurality of the controls, such that the controls can be operated for selecting the performance patterns, composing pattern sequence dada based on the selecting of the performance patterns, the pattern sequence data being effective to enable the portable terminal set to sequentially reproduce the selected performance patterns at predetermined timings, and converting the pattern sequence data into music data having a format common to the various information devices, such that the music data is transferable to the information device for reproduction of the selected performance patterns.

The invention includes a music reproduction program installable in a portable terminal set having a processor and a plurality of controls manually operable to control the portable terminal set. The inventive program is executable by the processor to carry out a method comprising the steps of storing a plurality of performance patterns in a storage, allocating the plurality of the performance patterns to the plurality of the controls, and responding to operation of the controls for reproducing the performance patterns allocated to the operated controls.

The invention also includes a music composition program executable in a portable terminal set having a processor and a plurality of controls manually operable to control the portable terminal set. The inventive program is executable by the processor to carry out a method comprising the steps of storing a plurality of performance patterns in a storage, allocating the plurality of the performance patterns to the plurality of the controls, such that the controls can be operated for selecting the performance patterns, setting timings of reproducing the performance patterns while operating the controls, and composing a sequence of the performance patterns based on the selecting of the performance patterns and the setting of the timings, the sequence being effective to enable the portable terminal set to sequentially reproduce the selected performance patterns at the set timings.

The invention still includes another music composition program installable in a portable terminal set which is associative with various information devices and which has a processor and a plurality of controls manually operable to control the portable terminal set. The inventive program is executable by the processor to carry out a method comprising the steps of storing a plurality of performance patterns in a storage, allocating the plurality of the performance patterns to the plurality of the controls, such that the controls can be operated for selecting the performance patterns, composing pattern sequence dada based on the selecting of the performance patterns, the pattern sequence data being effective to enable the portable terminal set to sequentially reproduce the selected performance patterns at predetermined timings, and converting the pattern sequence data into music data having a format common to the various information devices, such that the music data is transferable to the information device for reproduction of the selected performance patterns.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Preferred embodiments of the present invention will be described in further detail with reference to the accompanying drawings. The following embodiments are just an example. The present invention may be embodied in various modifications without departing from the spirit and scope of the invention.

System Overview

Figure 1:
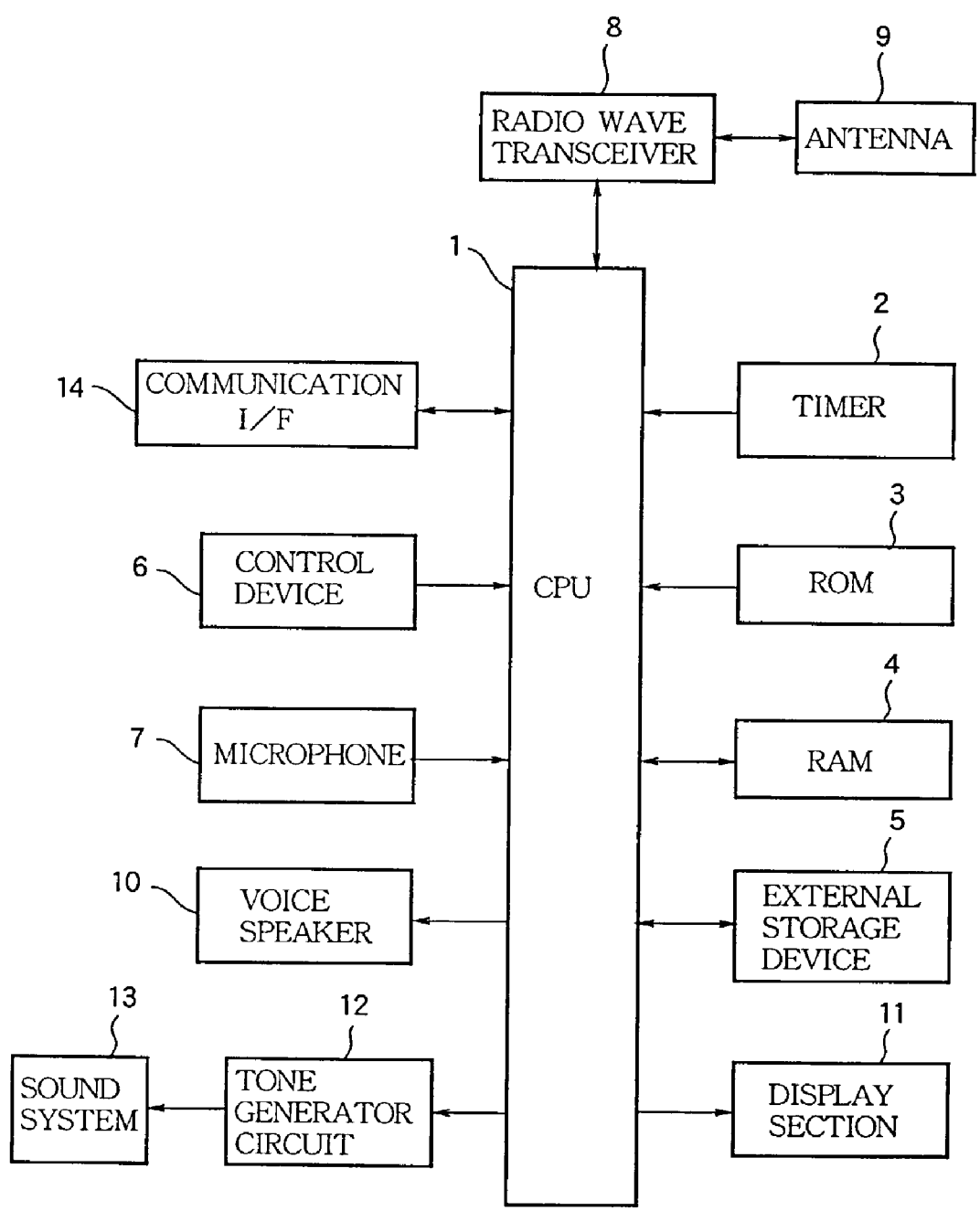
FIG. 1 is a block diagram showing a hardware configuration of the portable terminal set according to an embodiment of the present invention.

FIG. 1 is a block diagram schematically showing the hardware configuration of a portable terminal set according to an embodiment of the present invention. In this embodiment, the portable terminal set is a portable communication terminal device such as a cellular phone. The portable terminal set comprises a central processing unit (CPU) 1 that controls the terminal device and processes various types of data; a timer 2 that generates clocks for the control and processing; and storage means including read-only memory (ROM) 3 that records programs such as the OS, applications, etc. and various control data, random access memory (RAM) 4 that temporarily stores data for the control and processing, and an external storage device 5 that comprises a recording medium such as semiconductor memory or the like and functions as memory for temporarily storing various data.

The memory such as the ROM 3 and the external storage device 5 can record various data and application programs concerning music reproduction and creation application software according to the present invention. For example, the memory records performance pattern data (also referred to simply as a "pattern"), pattern sequence data, and music data used for the music reproduction and creation application software. Performance patterns and pattern sequence data are recorded in storage units called "pattern packs".

There are provided input means such as a control device (operation section) 6 for supplying a terminal system with necessary information based on various input operations through pattern allocation/specification switch or control (6s, 6a); and a microphone circuit 7 for inputting user's voice and the like. A radio wave transceiver controlled by the CPU 1 interchanges call speech signals and data signals with the other communication terminals, servers, etc. via an antenna 9. A user audibly receives speech signals such as received call speech signals via a voice speaker circuit (receiver) 10 under control of the CPU 1.

A display circuit (display section) 11 controlled by the CPU 1 comprises a display (11d) such as an LCD and displays visual information needed for various operations, controls, and process including sending and receiving signals on the portable terminal. The portable terminal further comprises a tone generator circuit 12 including a musical sound generation sound source and a sound system 13 including a musical sound speaker (sounder) in order to generate music pieces such as ring melodies. There is also provided a communication interface (I/F) 14 to send and receive various data and programs between the CPU 1 and the other information devices such as a personal computer (PC).

The portable terminal is connectable with external devices such as servers on the Internet and the other information processing apparatuses through the use of the radio wave transceiver 8 and the communication I/F 14. The portable terminal can obtain pattern packs from external devices and can transfer music data created in the portable terminal to external devices.

Basic System Operations and Pattern Pack

The OS (system program) and application programs are installed on the portable terminal such as a cellular phone according to the present invention. While the portable terminal is turned on, the OS is always active. A plurality of application programs are executed on the OS. Accordingly, a music reproduction process and a music creation (editing) process according to the present invention are realized by one of these application programs.

The memory is divided into a plurality of areas to process data on the portable terminal. Each area just records one data item. There is a limitation on the number of OS-manageable data items. The number of areas in the memory corresponds to the maximum number of data items the OS can manage.

According to the portable terminal's basic operation conditions, the example according to the present invention uniquely handles performance patterns used for the music reproduction and creation application software. A plurality of pattern data (e.g., 12 patterns) is contained in one "pattern pack" (also referred to simply as a "pack"). Each pattern pack is recorded in each memory area. The OS is allowed to recognize a plurality of pattern data in its entirety contained in each pattern pack as single data. The pattern data management is performed by allowing the application program (the music reproduction process and the music creation (editing) process) to extract a plurality of pattern data from one pattern pack. In this manner, the memory is used efficiently.

Namely, one memory area can just record one OS-recognizable data item. When only one data item is recorded, the remaining area becomes unusable. For example, however, let us consider a case where a pack (one data item) contains 12 patterns and is recorded in one memory area. In this case, the remaining and wasted capacity of the memory area becomes apparently smaller than that of the memory area recording only one pattern as a single data item. It is possible to greatly improve the effective use of the memory capacity.

Figures 2, 3:
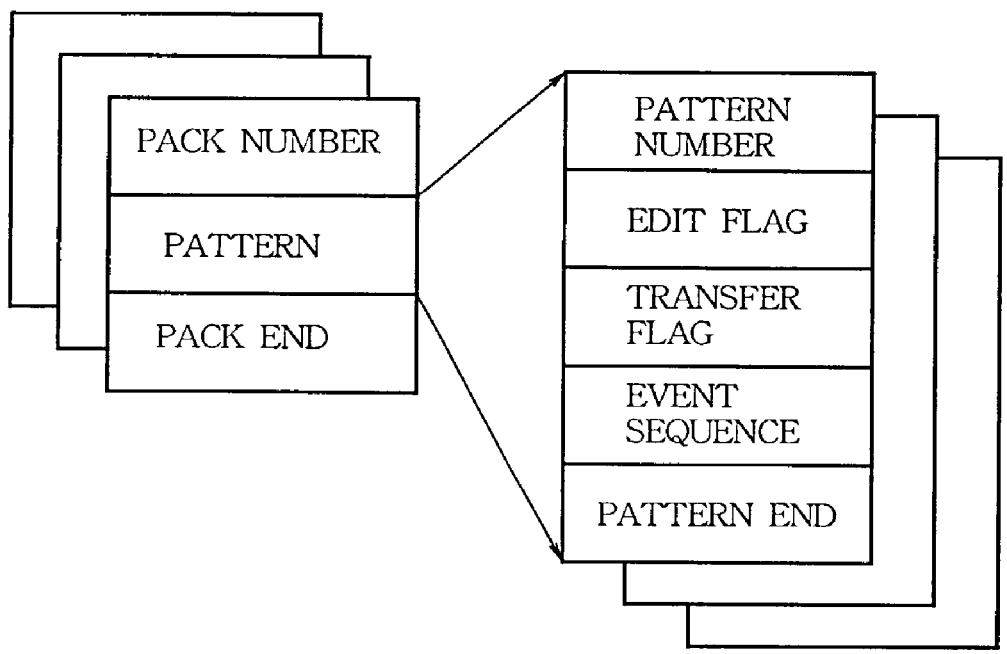
FIG. 2 shows a configuration example of a pattern pack used for music reproduction and creation application software according to the embodiment of the present invention.
FIG. 3 describes a configuration example of an allocation state buffer used for the music reproduction and creation application software according to the embodiment of the present invention.

FIG. 2 shows a configuration example of a pattern pack used for the music reproduction and creation application software according to the example of the present invention. The music reproduction and creation application software uses a plurality of pattern packs. One pattern pack is recorded in one memory area of the ROM 3 or the external storage device 5. As shown on the left side in FIG. 2, each pattern pack comprises a pack number, performance pattern data, and pack end data. The OS recognizes information from the pack head to the pack end as one data item.

As shown on the right side in FIG. 2, one pack contains a plurality of performance pattern data. The performance pattern data is used for reproducing a music approximately corresponding to a single bar and is used as element data for creating a music. Each performance pattern data comprises a pattern number, an edit flag, a transfer flag, event sequence data, and pattern end data. By contrast, an application for music reproduction and creation (editing) processes recognizes each pattern information from the pattern number data to the pattern end data as one pattern. For example, one pattern pack contains 12 pattern data items, i.e., "pattern 1" through "pattern 12". The following description uses the 12 patterns as an example.

A plurality of patterns contained in one pattern pack is created with musical relationship. For example, a plurality of patterns contained in one pattern pack is created on the basis of the same musical genre (rock, jazz, or pops), the same singer, or the same composer. A plurality of patterns contained in one pattern pack is divided into a synchronous pattern group and an asynchronous pattern group. Of the twelve patterns, i.e., patterns 1 through 12, patterns 1 through 6 are assumed to be synchronous patterns and patterns 7 through 12 to be asynchronous patterns.

A synchronous pattern is pattern data that starts reproduction in synchronization with a musical separating position such as a beat or a bar line. Like a so-called MIDI format, event sequence data based on the synchronous pattern records events representing instructions according to the process of the performance to generate the sound from the sound source in the tone generator circuit 12. That event sequence data is referred to as "MIDI-like" format data.

An asynchronous pattern is pattern data for starting reproduction immediately at the timing when the reproduction is instructed. Event sequence data based on the asynchronous pattern can use "WAVE" format data as well as the MIDI-like format data for synchronous patterns. The WAVE format data records events representing discrete values at each sampling timing for a sound waveform according to the process of the performance. The WAVE format data contains not only strictly music-related musical sound information, but also musically available sound information such as voice or natural sound (effect sound).

Allocation State Buffer and Configurations of the Operation and Display Sections FIG. 3 shows a configuration example of an allocated buffer used for the music reproduction and creation application software according to the example of the present invention. As shown in FIG. 3, the music reproduction and creation application software uses the allocation state buffer in the RAM 4 to store a pack number of the currently selected pattern pack and pattern numbers respectively allocated to pattern allocation/specification switches SW1 through SW12 on the operation section 6. The example in FIG. 3 shows that the pattern pack with the pack number (PACK) "3" is currently selected. Switches SW1, SW2, SW3, . . . , and SW12 are assigned with pattern number "1", "2", "3", . . . , and "12", respectively. Operating switches SW1 through SW12 makes it possible to select pattern data corresponding to the pattern number of the switch.

Figure 4:
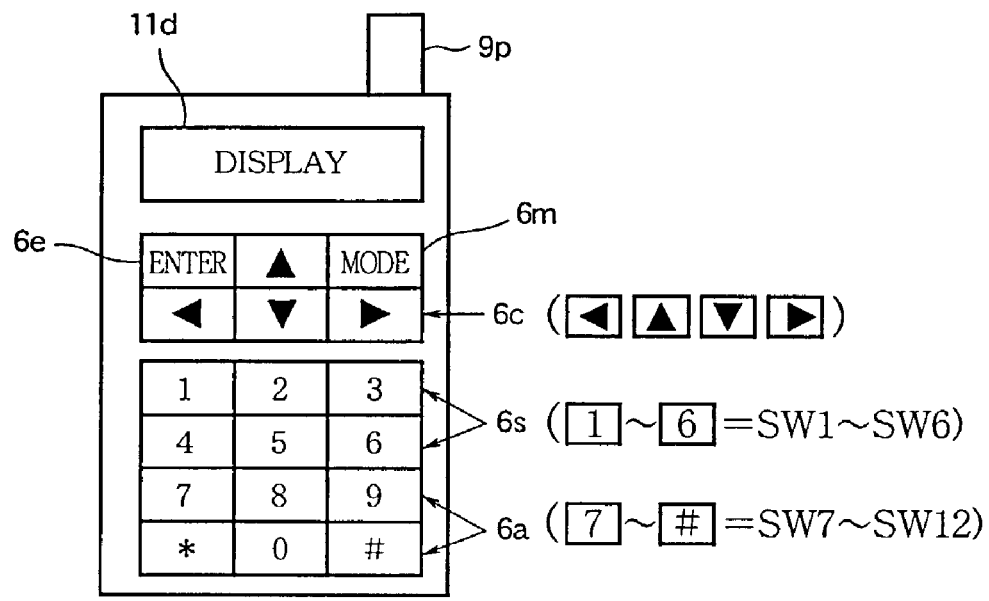
FIG. 4 shows a configuration example of switches or controls equipped on the portable terminal set according to the embodiment of the present invention.

FIG. 4 shows an example of the switch configuration on the portable terminal set according to the example of the present invention. As shown in FIG. 4, an operation panel of the portable terminal such as a cellular phone is provided with a display 11*d* and various switches and keys 6*m*, 6*c*, 6*e*, 6*s*, and 6*a*. The top of the case is provided with an antenna pole 9*p*. A mode switch 6*m*, each time it is pressed, sequentially selects operation modes of the portable terminal. When the mode switch 6*m* is operated to enable a music reproduction mode, for example, the display 11*d* displays all pattern packs recorded in the portable terminal with pack names, pack numbers, etc.

In this case, an ENTER key 6*e* functions as a pack decision switch. A user can operate cursor keys 6*c* such as □£ and □¥ to move the cursor to an intended pattern pack indicated on the display 11*d*, then operate the ENTER key 6*e* to select and determine the intended pattern pack. In the music reproduction mode or the music creation (editing) mode, ten numeric keypad keys and ★ and # keys function as the above-mentioned pattern allocation/specification switches SW1 through SW12. Of course, these keys function as switches for entering numbers and the like such as telephone numbers in the normal speech mode.

Keys 1 through 6 on the numeric keypad correspond to the above-mentioned switches SW1 through SW6. The keys are respectively assigned with synchronous patterns corresponding to pattern numbers 1 through 6 in the pattern pack. The keys belong to a synchronous pattern allocation/specification key 6*s* for specifying the synchronous patterns.

Keys 7 through 0 and the ★ and # keys on the numeric keypad correspond to the above-mentioned switches SW7 through SW12. The ★ key corresponds to SW10; the 0 key to SW11; and the # key to SW12. These keys are respectively assigned with asynchronous patterns corresponding to the pattern numbers 7 through 12. The keys belong to an asynchronous pattern allocation/specification key 6*a*.

Musical Sound Reproduction Overview

Figure 5:
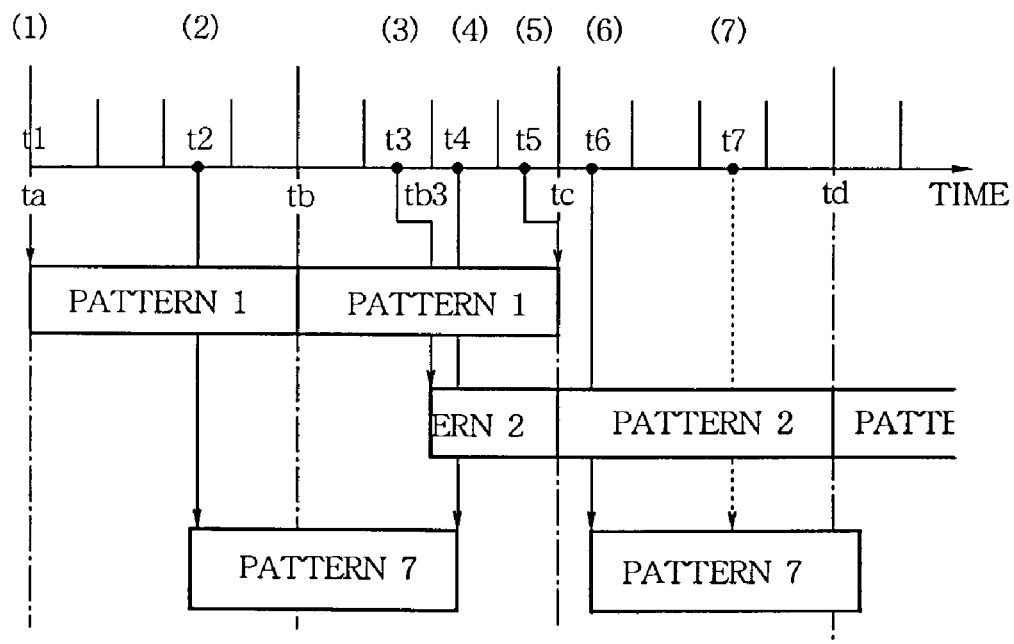
FIG. 5 shows an operation example of pattern reproduction by means of music reproduction application software according to the embodiment of the present invention.

FIG. 5 shows an example of pattern reproduction operations in the music reproduction application software according to the example of the present invention. In FIG. 5, an abscissa axis designates a time axis. Long vertical lines represent bar line timings ta, tb, tc, td, and so on corresponding to bar lines. A short vertical line denotes a beat timing. For example, the beat timing tb3 indicates the third beat timing in the bar between bar timings tb and tc.

The outline of the music reproduction will now be described with reference to FIG. 5. A performance pattern is allocated to each of the switch control devices 6*s* and 6*a* like numeric keypad keys on the portable terminal such as a cellular phone. Sequentially operating the switches SW1, SW7, SW2, and so on (t1, t2, t3, and so on) realtime reproduces performance patterns allocated to the switches. A plurality of performance patterns to be reproduced is contained in a pack, i.e., a minimum information unit that can be individually processed by the OS installed in the portable terminal. The music reproduction or creating application determines a performance pattern allocated to the switch in response to the pack selection. Performance patterns stored in each pack include synchronization and asynchronous patterns. The synchronous patterns 1, 2, and so on start to be reproduced at musical timings ta, tb3, and so on after time points t1, t3, and so on when the switches are operated. The asynchronous patterns 7 and so on start to be reproduced immediately at timings t2 and so on when the switches are operated.

With reference to FIG. 5, the following describes the example of pattern reproduction operations according to events (1) through (7) below in order when operating the mode switch 6*m* enables the music reproduction mode, the cursor key 6*c* is operated to select a pack, and then the pattern allocation/specification switches SW1 through SW12 are operated. As a matter of convenience, this operation example assumes all patterns used for a music reproduction process to be equal to a single bar length, a synchronous pattern to be MIDI-like format data, and an asynchronous pattern to be WAVE format data. The switches SW1, SW2, and SW7 are assigned with the patterns 1, 2, and 7, respectively, in a selected pattern pack (e.g., third pack). The patterns 1 and 2 are synchronous patterns. The patter 7 is an asynchronous pattern.

(1) The first switch SW1 (the "1" key) of the synchronous pattern allocation/specification key 6s is pressed at a given timing t1. The pattern 1 in the pattern pack is read from the first event to start reproduction of the pattern data. In this case, operating the switch SW1 is the first switch operation. The timer 2 to count the reproduction time starts counting the reproduction time by assuming the timing t1 to be a first bar line timing ta (=0). Namely, the timer 2 is reset at the timing t1.

(2) The first switch SW7 (the "7" key) of the synchronous pattern allocation/specification key 6s is pressed at a timing t2. The timing t2 to press the switch SW7 is neither a beat timing nor a bar lined timing. However, the pattern 7 specified by the switch 7 is an asynchronous pattern. Accordingly, the pattern 7 in the pattern pack immediately starts to be read from the first event at the timing t2 for operating the switch SW7.

(3) The second switch SW2 (the "2" key) of the asynchronous pattern allocation/specification key 6s is pressed at a timing t3. The timing to press the switch SW2 is neither the beat timing nor the bar line timing. Further, the pattern 2 is a synchronous pattern. Accordingly, the reproduction of the pattern 2 is delayed being started until a timing tb3 that is the first beat timing after the timing t3 to operate the switch SW2. When the beat timing tb3 immediately after the operation is reached, the pattern 2 starts to be read from the event (third-beat event) corresponding to the beat timing tb3. After the read starts, a plurality of synchronous patterns (patterns 1 and 2) is reproduced concurrently.

(4) The reproduced asynchronous pattern automatically stops at a timing t4 for stopping one-time reproduction of the asynchronous pattern. The asynchronous pattern, i.e., pattern 7, starts being reproduced at the timing t2 and stops being reproduced at the timing t4 because one-time reproduction stops at the timing t4.

(5) The synchronous pattern allocation/specification switch SW1 is pressed at a timing t5 while the pattern 1 corresponding to the switch SW1 is being reproduced. An operation for the synchronous pattern being reproduced is assumed to be an instruction to stop that pattern. Accordingly, it is determined to stop reproducing the pattern 1. However, the timing t5 to press the switch SW1 is neither the beat timing nor the bar line timing. The reproduction of the pattern 1 stops at a next beat or bar line timing tc.

(6) The asynchronous pattern allocation/specification switch SW7 is re-pressed at a timing t6. The pattern 7 enabled by the switch SW7 is an asynchronous pattern. Accordingly, the pattern 7 starts being read from its first event immediately at the timing t6 to press the switch SW7.

(7) The asynchronous pattern allocation/specification switch SW7 is pressed at a timing t7. Since the timing t7 is included in the period for reproducing the asynchronous pattern, i.e., the pattern 7, the operation of the switch SW7 at this timing is ignored.

Music Creation (Editing) Overview

Figure 6:
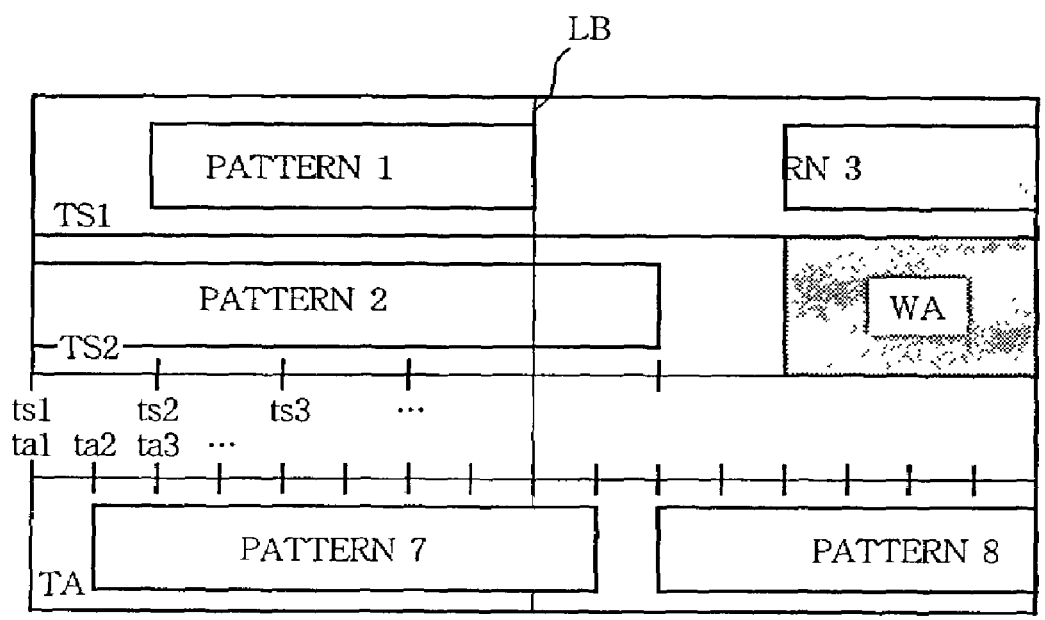
FIG. 6 shows a display example of a pattern sequence creation (editing) screen by means of music creation application software according to the embodiment of the present invention.

FIG. 6 shows a display example on a pattern sequence creation (editing) screen in a music creation application software according to the example of the present invention. When the mode switch 6m is operated to enable the music creation (editing) mode, the display 11d displays all pattern packs available for pattern sequence creation together with pack names and pack numbers like in the music reproduction mode. A user operates the cursor keys 6c to select a pack number to be used for the pattern sequence creation, and then presses the ENTER key 6e to determine the pattern pack to be used for the pattern creation. As a result, the display 11d shows the pattern sequence creation (editing) screen as shown in FIG. 6.

The overview of the music creation (editing) will now be described with reference to FIG. 6. Performance patterns are respectively allocated to the switches 6s and 6a on the numeric keypad or the like provided on the portable terminal such as a cellular phone. A pattern write segment WA is specified in synchronous pattern display columns TS1 and TS2 or an asynchronous pattern display column TA on the pattern sequence creation (editing) screen according to the scale representing timings ts1, ts2, and so on and timings ta1, ta2, and so on. When an intended switch is selectively operated, the performance pattern allocated to the switch is associated with the interval WA to create a pattern sequence that gives an instruction to reproduce the selected performance pattern at a timing in the interval WA. When the performance pattern is a synchronous pattern, the pattern sequence instructs to start the reproduction from an event corresponding to the specified timings ts1, ts2, and so on. When the performance pattern is an asynchronous pattern, the pattern sequence instructs to start the read operation from the beginning corresponding to the specified timings ta1, ta2, and so on.

In more detail, the pattern sequence creation (editing) screen displays the lapse of time along the abscissa direction. A plurality of pattern display columns TS1, TS2, and TA is arranged along the ordinate direction. The pattern display columns TS1, TS2, and TA can display a pattern sequence of synchronous patterns and asynchronous patterns in an expanded manner. On the screen example in FIG. 6, two synchronous pattern display columns TS1 and TS2 are arranged in two upper rows. The asynchronous pattern display column TA is arranged in a lower row. The first and second synchronous pattern display columns TS1 and TS2 can respectively display pattern sequences recorded on the first and second tracks of the synchronous pattern. The asynchronous pattern display column TA can display a pattern sequence recorded on the track of the asynchronous pattern. It is possible to properly adjust the number of tracks (i.e., the number of pattern display columns) based on the portable terminal's capabilities.

In this screen example, a bar line LB is displayed across the columns TS1, TS2, and TA so as to easily identify a temporal position. Between the upper and lower rows, there is displayed the temporal scale indicative of musical timings such as beat timings ts1, ts2, and so on along the temporal axis corresponding to the synchronous pattern display columns TS1 and TS2. There is displayed the temporal scale indicative of musical timings ta1, ta2, and so on finer than the beat timings ts1, ts2, and so on corresponding to the asynchronous pattern display column TA.

To create a pattern sequence, the cursor keys 6c are first operated to indicate the pattern display columns TS1, TS2, and TA. After specifying a start point for the pattern in each column, the ENTER key 6e is operated to determine the pattern's start point. An asynchronous pattern can be specified just by setting the start point in this manner. To specify a synchronous pattern, the cursor key 6c is further used to specify the pattern's end point. Then, the ENTER key 6e is used to determine the end point.

Deciding the start and end points in this manner specifies a range of pattern arrangement. The specified range is shaded. The shaded portion WA indicates an area where a user-defined new pattern can be written. Further, when a user selectively operates any of the pattern allocation/specification switches 6s and 6a (SW1 through SW12) corresponding to the pattern to be placed in the shaded portion WA, the shaded portion WA displays the intended pattern in an expanded manner. Finally, operating the decision (ENTER) key 6e records the pattern at a position corresponding to the associated track.

The time range in FIG. 6 shows that there is already created a pattern sequence of the first track of the synchronous pattern and the track of the asynchronous pattern in the pattern display columns TS1 and TA. The second track of the synchronous pattern contains the pattern 2 written in the specified segment of the second synchronous pattern display column TS2. With an interval of one beat after the pattern 2, the shaded portion shows that the pattern write segment WA is specified for writing a new pattern.

The synchronous pattern can allow the start and end points of the pattern write segment WA to be specified with the bar line timings ts1, ts2, and so on. As represented by the pattern 2 in the synchronous pattern display column TS2, the synchronous pattern can be pasted so as to correspond to the bar line LB or a beat position in the specified segment. On the other hand, for example, the asynchronous pattern can specify the start point of the pattern write segment WA with the timings ta1, ta2, and so on finer than the beat timings ts1, ts2, and so on as indicated by the scale above the asynchronous pattern display column TA.

Figure 7:
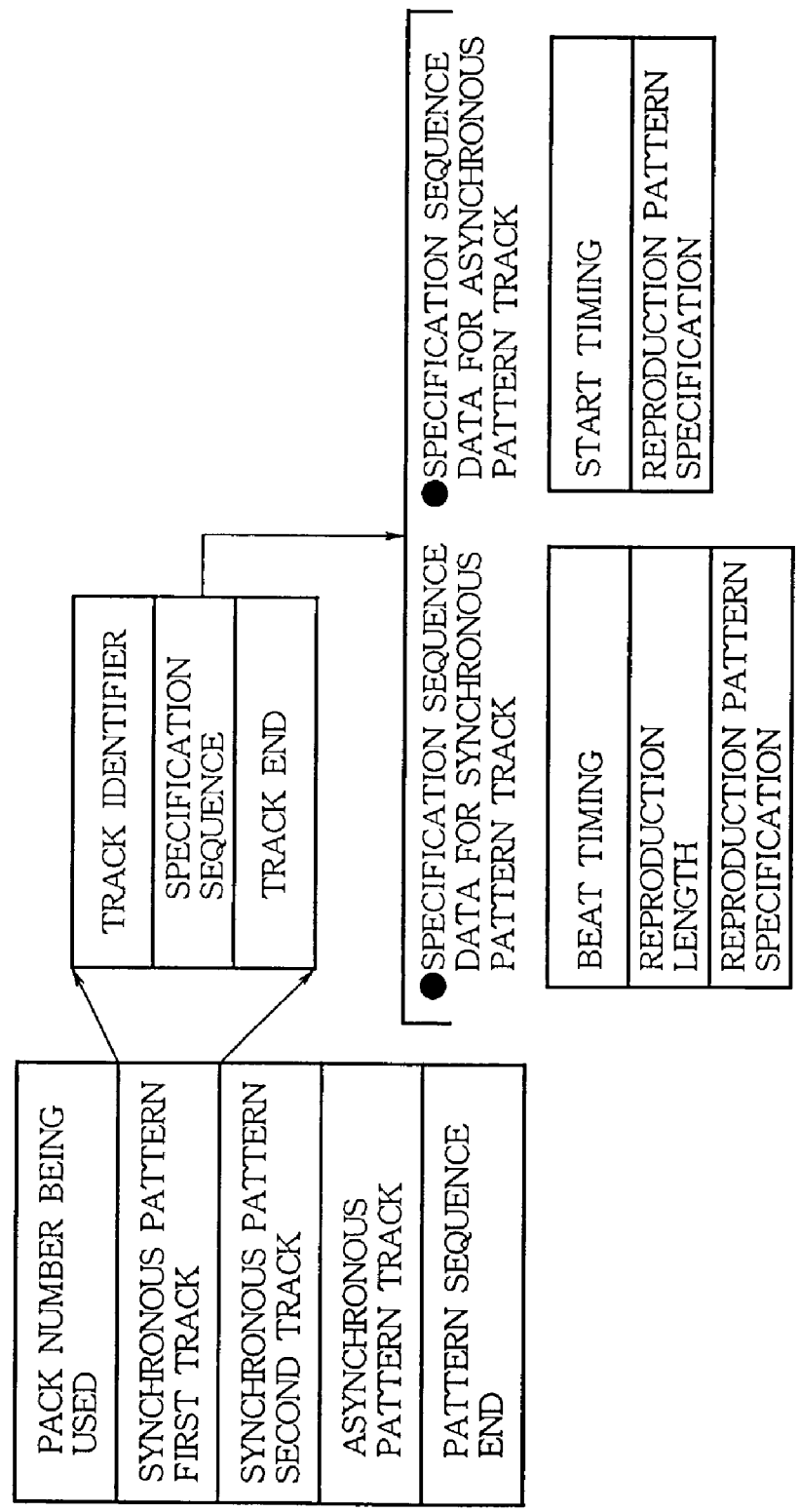
FIG. 7 shows a configuration example of a pattern sequence created by the music creation application software according to the embodiment of the present invention.

FIG. 7 shows a configuration example of pattern sequence data created by the composition creation application software according to the example of the present invention. The creation (editing) screen as shown in FIG. 6 is used to create pattern sequence data (also referred to simply as a "pattern sequence"). As shown on the left side in FIG. 7, the pattern sequence data comprises a pack number of the pack used, synchronous pattern's first track data, synchronous pattern's second track data, asynchronous pattern's track data, and pattern sequence end data.

The synchronous pattern's first track data, the synchronous pattern's second track data, and the asynchronous pattern's track data correspond to data displayed in the pattern display columns TS1, TS2, and TA on the creation (editing) screen in FIG. 6, respectively. Each of these track data comprises a track identifier, specification sequence data (also referred to simply as a "specification sequence"), and track end data.

As shown at the bottom in FIG. 7, the specification sequence data on a synchronous pattern track records a set of data: beat timing data to represent the start point and a start beat of the synchronous pattern to be reproduced; reproduction length data to represent the time from the start point to the end point of the synchronous pattern to be reproduced; and reproduction pattern specification data (pattern number) to specify the synchronous pattern to be reproduced from the pack being used. The set of these data is recorded in the order of patterns to be reproduced. On the other hand, the specification sequence data on an asynchronous pattern track records a set of data: start timing data to represent the start point of the asynchronous pattern to be reproduced; and reproduction pattern specification data (pattern number) to specify the asynchronous pattern to be reproduced from the pack being used. The set of these data is also recorded in the order of patterns to be reproduced.

Figure 8:
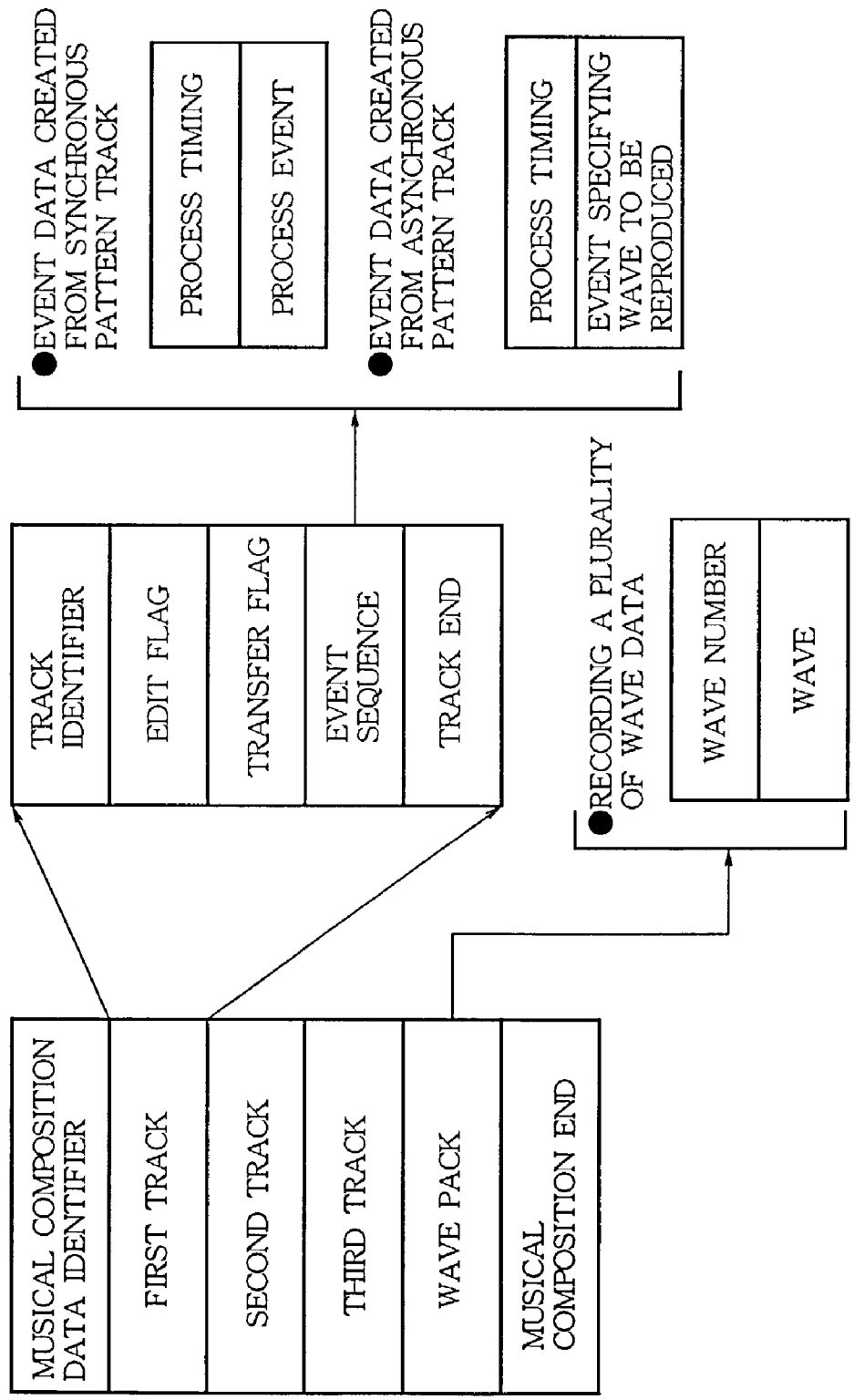
FIG. 8 shows a configuration example of music data created by performance pattern expansion process of the music creation application software according to the embodiment of the present invention.

FIG. 8 shows a configuration example of music data created by performance pattern expansion in the music creation application software according to the example of the present invention. Based on the pattern sequence data as shown in FIG. 7, the music creation application software can create music data having a data format capable of reproduction on a plurality of cellular phone types. As shown on the left side in FIG. 8, the music data comprises a music data identifier, first track data, second track data, third track data, WAVE pack data, and music end data.

As shown at the top center in FIG. 8, the first to third track data comprise a track identifier, an edit flag, a transfer flag, event sequence data, and a track end data. Typically, the first and second track data correspond to the synchronous pattern's first and second track data. The third track data corresponds to the asynchronous pattern's track data. Event sequence data in the first to third track data slightly differ from each other depending on whether the event sequence data is created from a synchronous pattern track or an asynchronous pattern track.

When created from a synchronous pattern track as shown at the top right in FIG. 8, the event sequence data is a sequence of event data (MIDI-like format data) comprising a process timing and a process event arranged in the time-series order. When created from an asynchronous pattern track, the event sequence data is formed differently depending on whether an asynchronous pattern is represented in the MIDI-like format or the WAVE format. When the asynchronous pattern is represented in the MIDI-like format, the event sequence data is formed in the same manner as described for the synchronous pattern. When the asynchronous pattern is represented in the WAVE format, as shown at the bottom right in FIG. 8, the event sequence data is formed to be a sequence of event data comprising a process timing to indicate a reproduction start point and an event to specify WAVE data to be reproduced (WAVE specification data) arranged in the time-series order.

A WAVE pack in the music data comprises a plurality of recorded WAVE data. As shown at the bottom center in FIG. 8, each WAVE data comprises a WAVE number and WAVE (waveform). During reproduction, the WAVE data is read according to the specification of the WAVE specification data in the asynchronous pattern track (typically the third track) out of the first to third tracks.

OS Process Example

Figure 9:
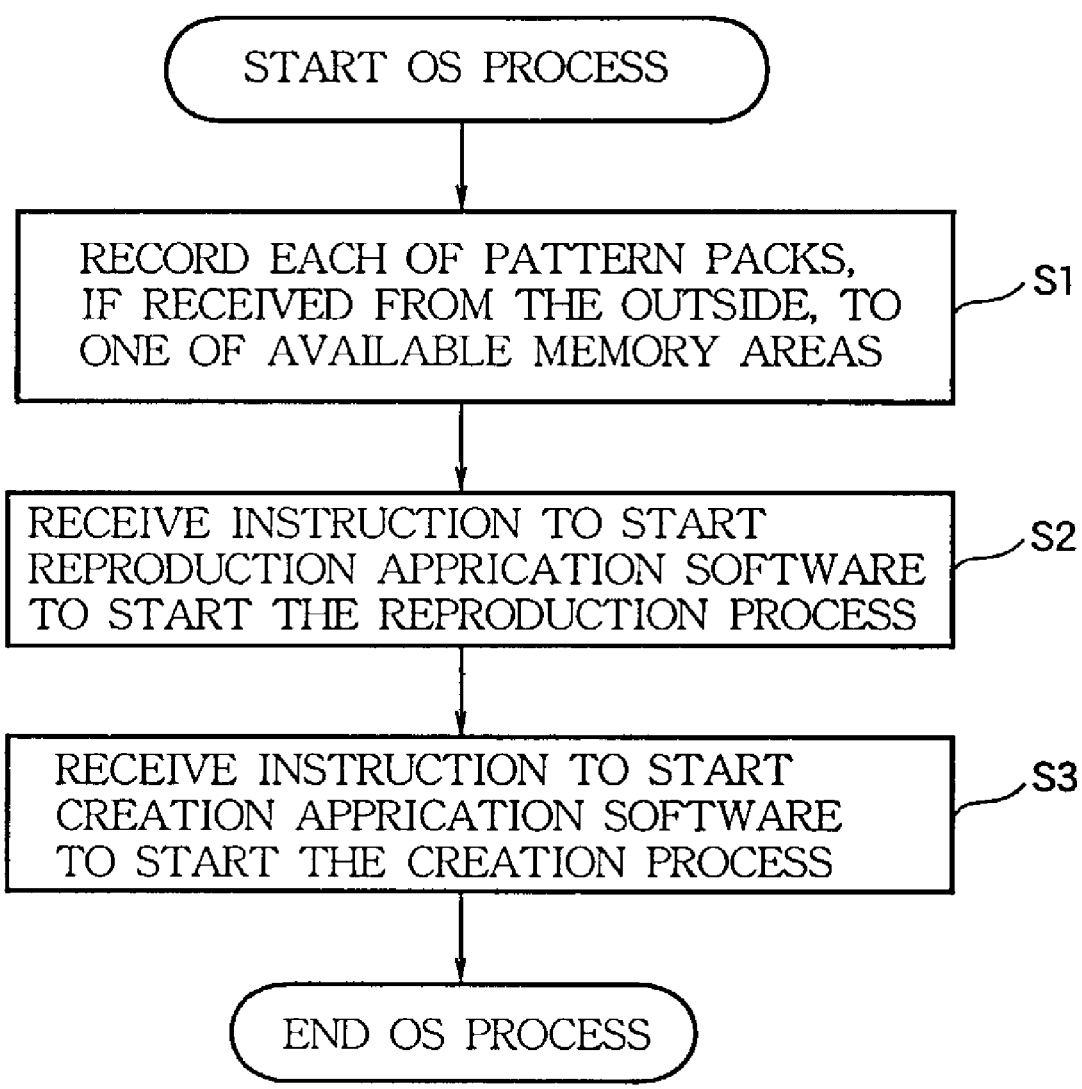
FIG. 9 is an example of an OS process for the portable terminal set according to the embodiment of the present invention.

FIG. 9 is a flowchart showing an example of the OS process on the portable terminal according to the example of the present invention. The OS process is performed repeatedly after the portable terminal such as a cellular phone is turned on until it is turned off. The OS can process basic cellular phone operations in addition to the process as shown in FIG. 9. When the OS process starts, it records each of pattern packs, if received from the outside, in one of available memory areas on the external storage device 5.

At step S2, the OS process receives an instruction to start the music reproduction application software and starts a music reproduction process. The music reproduction process sequentially selects performance patterns in the pack to form a music for reproduction.

At step S3, the OS process receives an instruction to start the music creation application software and starts a music (editing) creation process. When the music creation application software is executed, the display displays a screen (FIG. 6) for creating and editing a music (creating and editing a pattern sequence). The music (editing) creation process arranges performance patterns selected from the pack in the reproduction order to form a music, creating a pattern sequence or music data.

Procedure of the Music Reproduction Application Software

Figure 10:
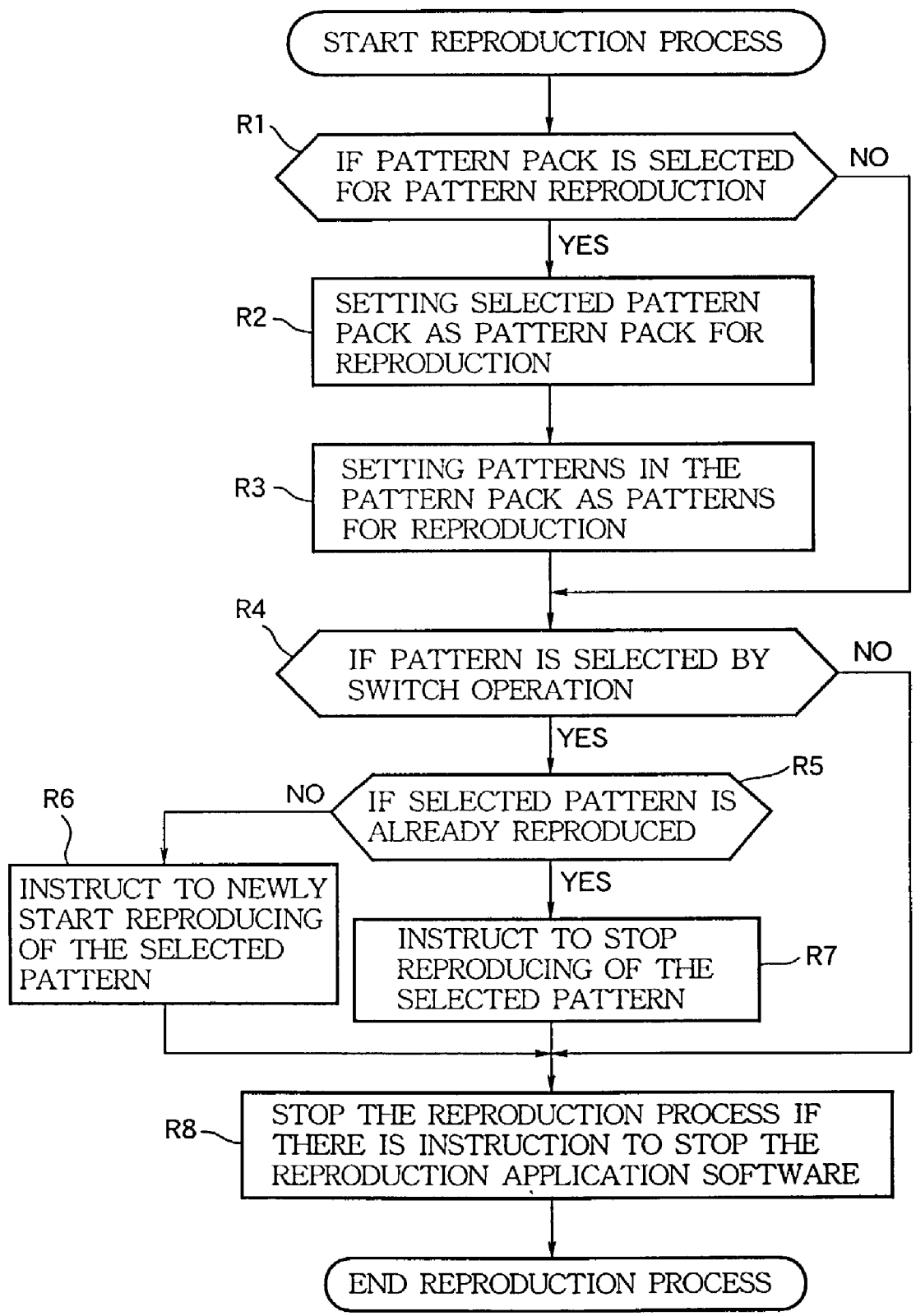
FIG. 10 is a flowchart showing an example of a music reproduction process according to the embodiment of the present invention.
Figure 11:
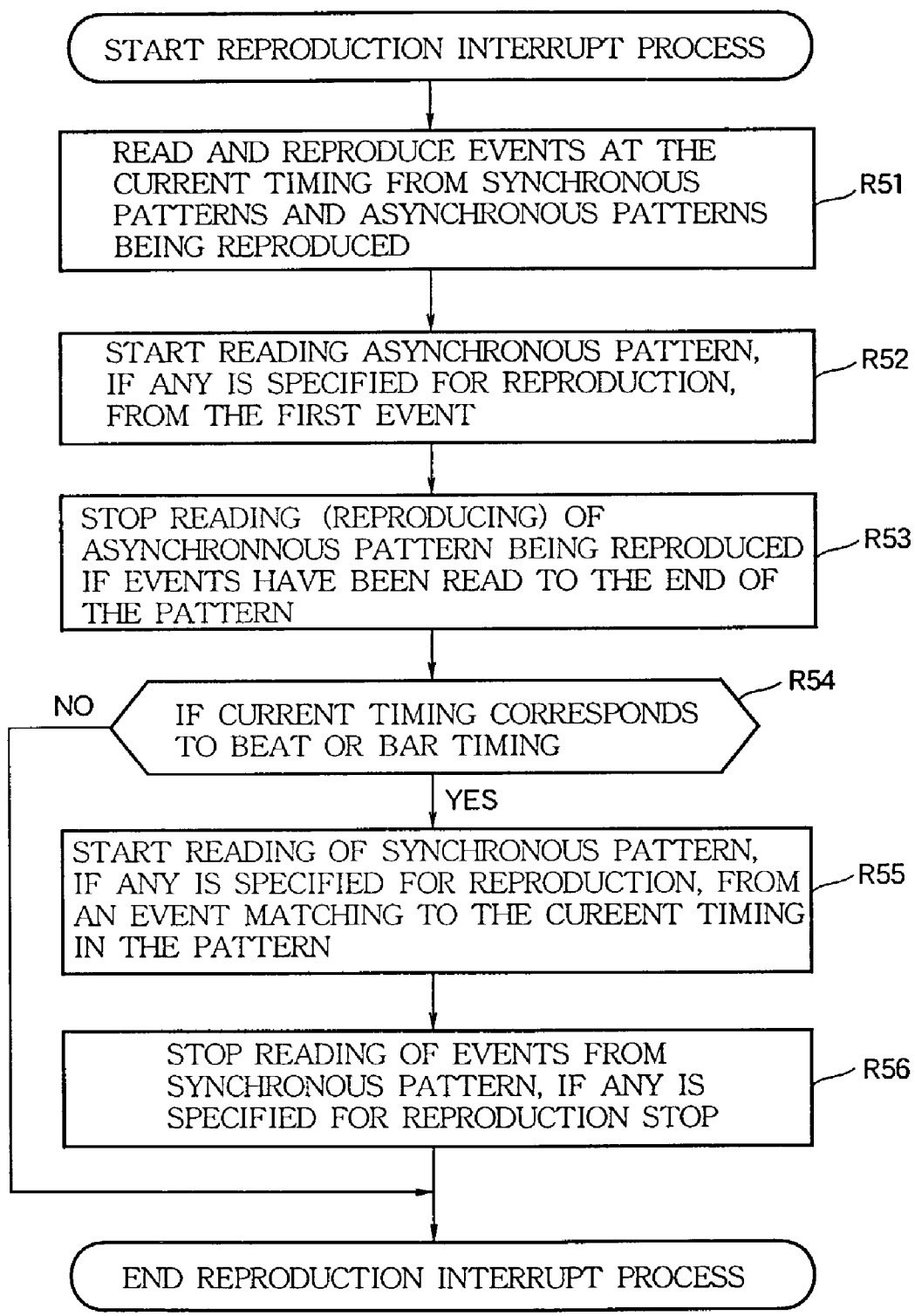
FIG. 11 is a flowchart showing an example of a music reproduction interrupt process according to the embodiment of the present invention.

FIGS. 10 and 11 are flowcharts showing operation examples of the music reproduction process and a music reproduction interrupt process according to the example of the present invention. The music reproduction process in FIG. 10 and the music reproduction interrupt process in FIG. 11 operate according to the music reproduction application software program. The music reproduction process in FIG. 10 operates repeatedly from the time an instruction to start the music reproduction application software program is issued until an instruction to stop it is issued. When the music reproduction process is active, there may be an instruction issued to perform an operation essential to the portable terminal such as speech processing. In such a case, the music reproduction process stops temporarily to perform the operation based on that instruction.

When operating the mode switch 6*m* enables the music reproduction mode in FIG. 10, the music reproduction process starts. The display 11*d* displays pattern packs available for reproduction. At step R1, it is determined whether or not a pattern pack used for pattern reproduction is selected anew. If a pattern pack is selected (through an operation to select a new pack using the key 6*c* or 6*e*) (YES at R1), the selected pattern pack is specified as a pattern for reproduction. At step R3, a pattern in the pattern for reproduction is specified as a pattern for reproduction.

The above-mentioned steps R2 and R3 set patterns or change the setup of patterns to be allocated to the pattern allocation/specification switches SW1 through SW12 according to the pattern pack selection. Namely, at step R2, the music reproduction process reads a pattern pack (one data item) newly selected for reproduction from the memory area (the ROM 3 or the external storage device 5) and writes the pattern pack to a specified buffer in the RAM 4. At step R3, the process separates a plurality of patterns contained in the selected reproduction pattern pack at every pattern end data. The process allocates each pattern, as a pattern for reproduction, to a corresponding one of the switches SW1 through SW12 used for reproduction. The process writes the selected pattern pack number and the pattern numbers allocated to the switches SW1 through SW12 onto the allocation state buffer (see FIG. 3).

If it is determined that a new pack is not selected (NO at R1) and after the process at step R3 is complete, control proceeds to step R4. It is determined whether or not any pattern is selected by operating the pattern allocation/specification switches SW1 through SW12. If a pattern is selected (YES at R4), control proceeds to step R5 to determine whether or not the selected pattern is already being reproduced.

If the selected pattern is not being reproduced (NO at R5), the process sets an instruction to newly start the selected pattern at step R6. This setup is performed by allowing a start buffer in the RAM to register the pattern number of the pattern that is instructed to newly start reproduction. As shown in FIG. 5 (1) through (3) and (6), for example, when a user selects patterns 1, 7, and 2 that are not being reproduced, it is determined that these patterns should start being reproduced anew. The pattern numbers 1, 7, and 2 are registered to the start buffer. When the instruction to start reproducing patterns is issued with no pattern reproduced as shown in FIG. 5 (1), the timer 2 to count the reproduction time is reset.

If the selected pattern is already reproduced (YES at R5), the process sets an instruction to stop the reproduction of the selected pattern at step R7. This setup is performed by allowing a stop buffer in the RAM to register the pattern number of the pattern that is instructed to stop the reproduction. When the pattern 1 is selected while it is reproduced as shown in FIG. 5 (5), for example, it is determined that the reproduction of the pattern 1 should be stopped. The pattern number 1 is registered to the stop buffer. When the reselected pattern being reproduced is an asynchronous pattern like the pattern 7 in FIG. 5 (7), a selection operation for this patter is invalidated.

As will be described later, the music reproduction interrupt process (FIG. 11) provides control to start and stop reproducing the pattern specified at steps R6 and R7 and to process events based on the pattern reproduction start.

If there is no pattern selection operation (NO at R4) and after the process at steps R6 and R7 is complete, control proceeds to step R8. If an instruction is issued to stop the music reproduction application software, the reproduction process stops and the music reproduction process terminates. If such stop instruction is not issued, control returns to step R1 to repeat the above-mentioned operations at steps R1 through R7 until the stop instruction is issued.

The music reproduction interrupt process in FIG. 11 is operating by interrupting the reproduction process while the music reproduction application software is active. An interrupt cycle is shorter than resolutions to read events for an asynchronous pattern and a synchronous pattern. Reference to the start buffer and the stop buffer in the RAM 4 determines whether or not a pattern to start or stop its reproduction is available for the music reproduction interrupt process. Namely, a pattern registered to the start buffer is to be started being reproduced anew. A pattern registered to the stop buffer is to be stopped being reproduced anew. The pattern's pattern number can determine whether the pattern type is a synchronous pattern or an asynchronous pattern.

When the music reproduction interrupt process in FIG. 11 starts, it reads current timing events for synchronization and asynchronous patterns being reproduced and reproduces the patterns at step R51. In FIG. 5, for example, the process reads interrupt timing events for the pattern 1 in segments between ta and tb and between tb and tc. The process reads interrupt timing events for the pattern 2 in segments between tb3 and tc, between tc and td, and between td and a given point. The process reads interrupt timing events for the pattern 7 in segments between t2 and t4 and between t6 and a given point.

At steps R52 and R53, the process starts or stops reproducing an asynchronous pattern. First at step R52, when there is an asynchronous pattern specified for the reproduction start, the process starts reading the asynchronous pattern from its first event. When the patterns 7, asynchronous patterns, are specified for the reproduction start as shown in FIG. 5 (2) and (6), for example, the process starts reading these patterns from the first events.

Then at step R53, the process stops reading (reproducing) the asynchronous pattern being reproduced when the pattern's events have been read to the end of the pattern. Namely, the reproduction of an asynchronous pattern automatically stops when one-time reproduction is complete. In FIG. 5, for example, reading of the pattern 7 (asynchronous pattern) stops at the timing t4 when events have been read to the end of the pattern 7. Any asynchronous pattern allocation/specification switch (SW7 through SW12) may be selected while the asynchronous pattern allocated to the selected switch is being reproduced. In such case, the selection operation is invalidated. Control is provided to automatically stop the asynchronous pattern independently of the selection operation (see FIG. 5 (7)).

At step R54, it is determined whether or not the current timing corresponds to a beat or a bar line. If the timing is determined to be a beat timing or a bar line timing, control proceeds to steps R55 and R56 in succession to start and stop reproducing synchronous patterns. Namely, the reproduction of synchronous patterns starts or stops in synchronization with beat timings (tb3 and the like) or bar line timings (ta, tb, and the like). After the synchronous pattern is reproduced once, the reading position is returned to the beginning to continue the reproduction. The reproduction is repeated until an instruction to stop the reproduction is issued by reoperating the synchronous pattern allocation/specification switch (SW1 through SW6) assigned to the pattern being reproduced.

At step R55, when there is a synchronous pattern specified for the reproduction start, the process starts reading (reproducing) the pattern from an event corresponding to the current timing in the pattern. In the case of FIG. 5 (1), for example, the process starts reading the pattern 1 (synchronous pattern) from the beginning at the bar line timings ta (=t1) and tb where instructions are issued to start and continue the reproduction. In the case of FIG. 5 (3), an instruction is issued to start reproduction of the pattern 2 (synchronous pattern) at the timing t3. At the next beat timing tb3, the process starts reading events at the third beat and later for the pattern 2. At the bar line timings tc and td, the process starts reading the pattern according to an instruction to automatically continue the reproduction.

At step R56, when there is a synchronous pattern specified for the reproduction stop, the process stops reading (reproducing) events for the pattern. Namely, when an instruction to stop the reproduction is issued, the synchronous pattern stops being reproduced synchronously with the first beat or bar line timing after the instruction is issued. For example, the bar line timing tc in FIG. 5 is the first beat or bar line timing after the time point (t5) when an instruction is issued to stop reproducing the pattern 1. Accordingly, the process stops reproducing the patter 1 at the timing tc.

If it is determined that the current timing is neither a beat timing nor a bar line timing (NO at R54) and after the process at step R56 is complete, the current music reproduction interrupt process terminates and waits until the next interrupt timing.

Procedure of the Music Creation Application Software

Figure 12:
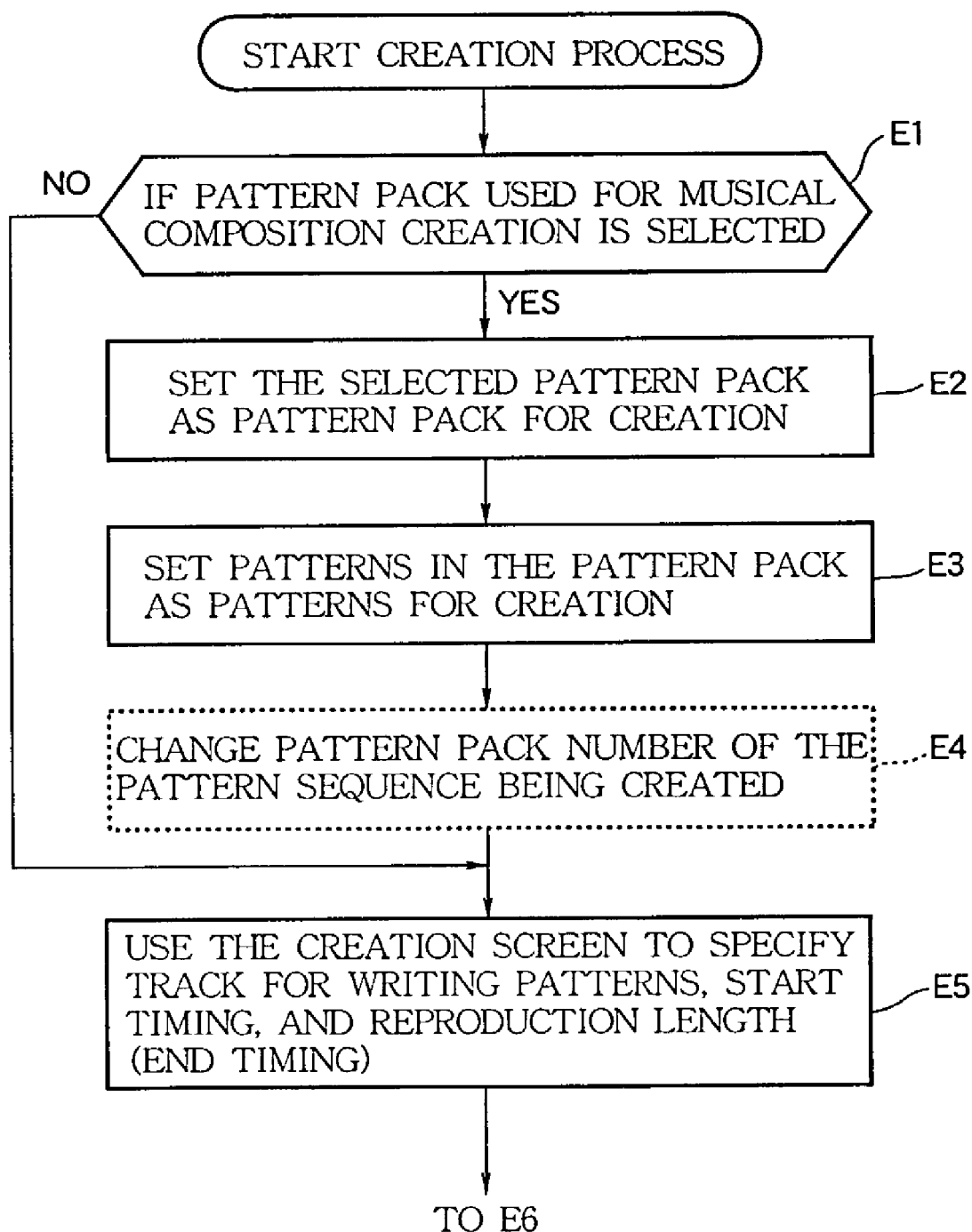
FIG. 12 is a flowchart showing an example of a music creation (editing) process according to the embodiment of the present invention.
Figure 13:
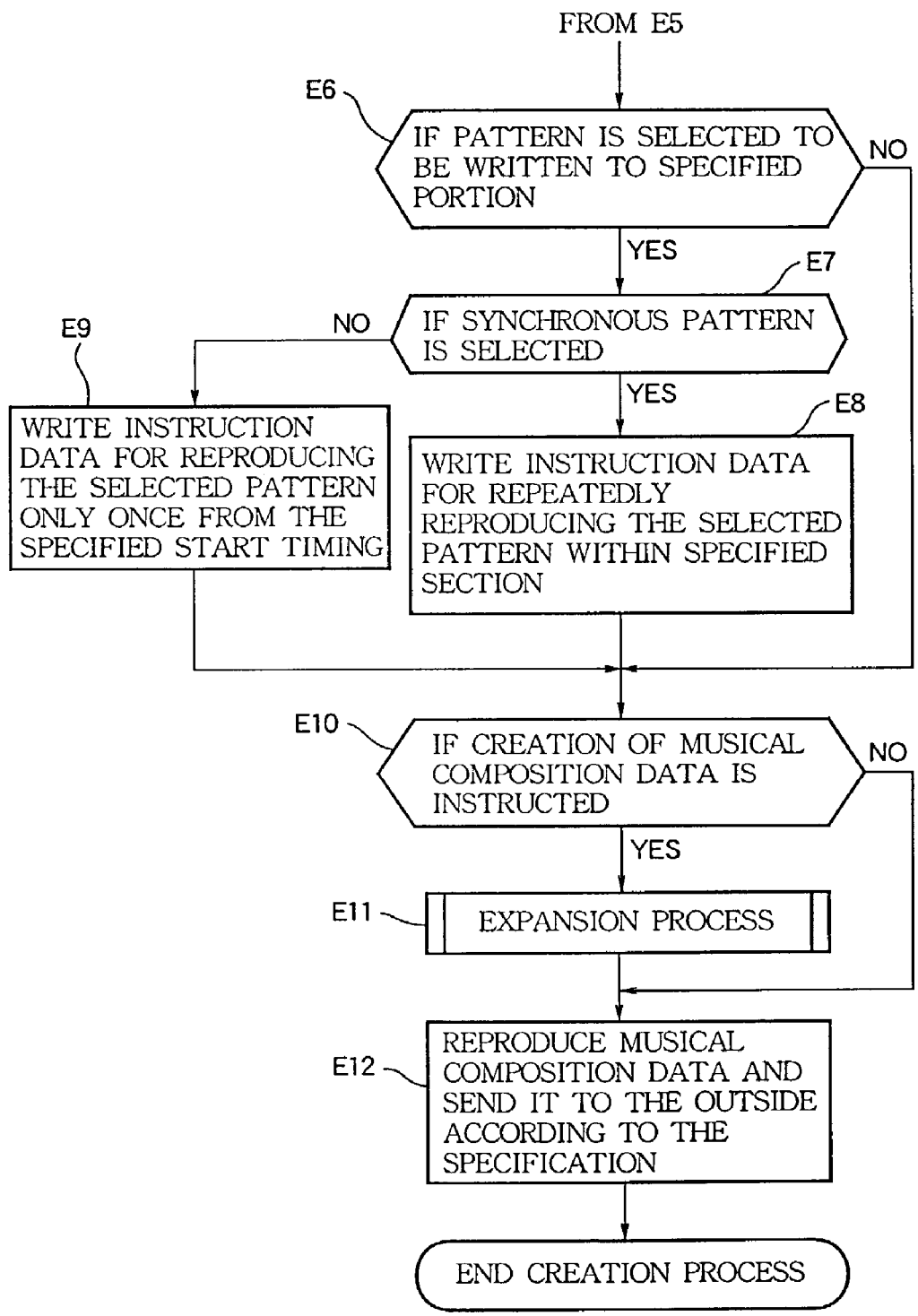
FIG. 13 is a flowchart showing another part of the example of the music creation (editing) process according to the embodiment of the present invention.
Figure 14:
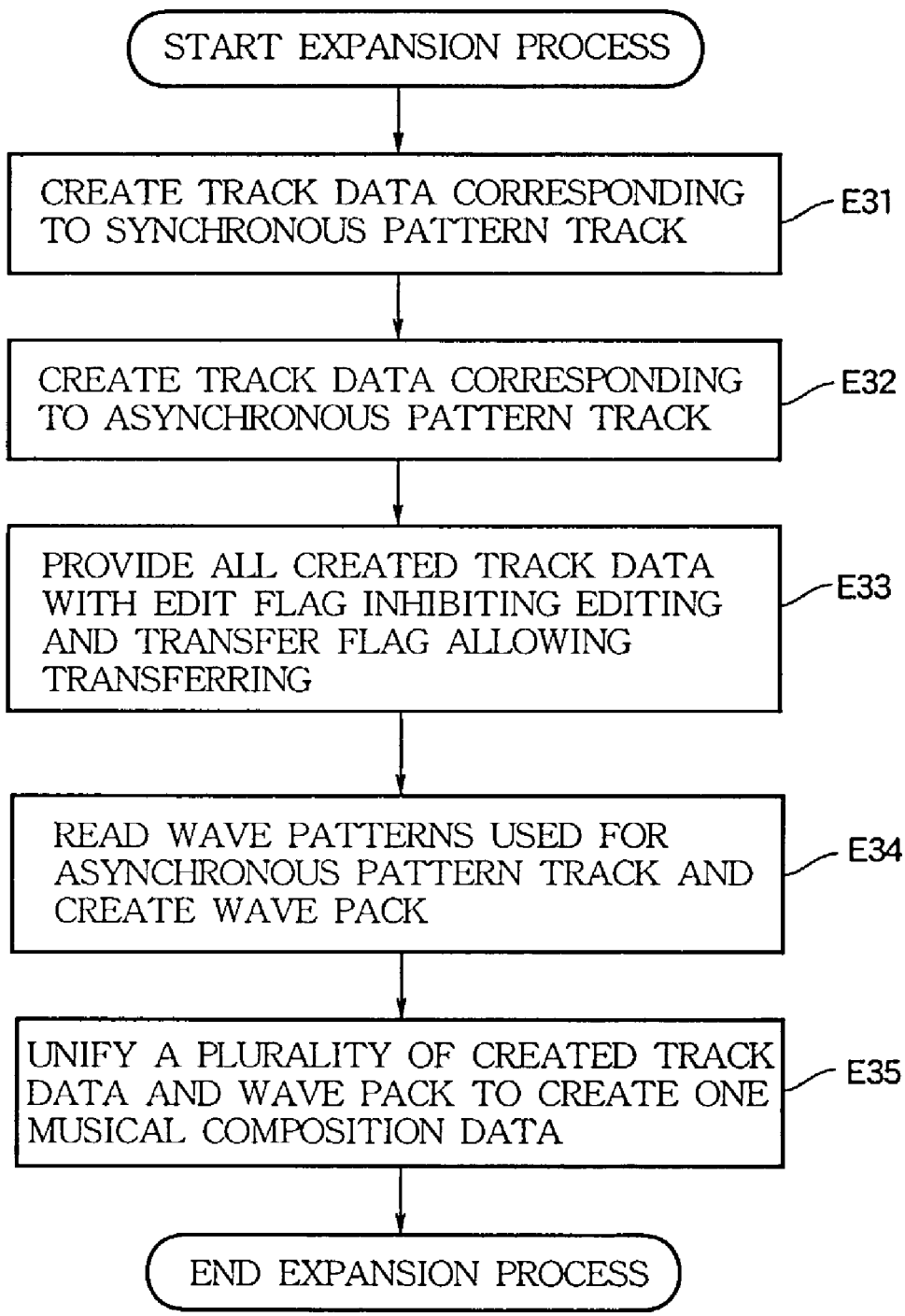
FIG. 14 is a flowchart showing an example of a performance pattern expansion process according to the embodiment of the present invention.

FIGS. 12 and 13 are flowcharts showing operation examples of the music creation (editing) process according to the example of the present invention. FIG. 14 is a flowchart showing an operation example of a performance pattern expansion process according to the example of the present invention. These processes associated with the music creation operate in accordance with the music creation application software program.

The music creation (editing) process in FIGS. 12 and 13 operates repeatedly from the time an instruction to start the music creation application software program is issued until an instruction to stop it is issued. Like the case of the music reproduction process, when the music creation (editing) process is active, there may be an instruction issued to perform an operation essential to the portable terminal such as speech processing. In such a case, the music reproduction process stops temporarily to perform the operation based on that instruction.

When operating the mode switch 6m enables the music creation mode in FIG. 12, the music creation (editing) process starts. The display 11d displays pattern packs available for the music creation (editing). The pattern packs displayed here are limited to those that contain editable patterns whose edit flag is set to "editable". At step E1, it is determined whether or not a pattern pack used for the music creation is selected anew.

If the process detects an operation to select a pattern pack (YES at E1), control proceeds to steps E2 and E3 in succession. Like steps R2 and R3 of the reproduction process, the music creation (editing) process sets patterns or changes the setup of patterns to be allocated to the pattern allocation/specification switches SW1 through SW12. At step E, the process specifies the selected pattern pack to be a pattern pack for creation. At step E3, the process specifies patterns in the specified pattern pack for creation to be patterns for creation and stores the specified pattern pack and patterns in the allocation state buffer. Patterns that can be allocated to the switches are only those in the selected pattern whose edit flag is set to "editable".

At step E4, the process changes the pattern pack number of the pattern sequence being created. Namely, only the setting of the pattern pack to be used is changed without changing pattern numbers recorded in the pattern sequence being created. It is possible to change the music to another using the contents of the pattern sequence just by changing the pattern pack number. All pattern packs have the same configuration and contain the same number of synchronous patterns and asynchronous patterns. The same pattern numbers are used for synchronous patterns and asynchronous patterns. For example, a pattern pack contains 12 patterns. Patterns 1 through 6 are synchronous patterns; patterns 7 through 12 are asynchronous patterns.

If the process does not detect an operation to select a pattern pack (NO at E1) and after the process at step E3 or E4 is complete, control proceeds to step E5. (Changing the pattern pack number at step E4 may or may not be applicable.) At step E5, the pattern sequence creation (editing) screen (FIG. 6) is used to set a track for writing the specified pattern, a start timing, and a reproduction length (end timing). Namely, the process sets the pattern write segment WA (shaded portion) with a specified length to a specified position in the specified pattern display column (TS1, TS2, or TA) on the pattern sequence creation (editing) screen.

At step E6 (FIG. 13), it is determined whether or not a pattern to be written to the specified pattern write segment WA is selected. If the process detects an operation of the switches SW1 through SW12 to select the pattern to be written to the pattern write segment WA, it is further determined at step E7 whether or not the selected pattern is an synchronous pattern.

If the selected pattern is a synchronous pattern (YES at E7), the process proceeds to step E8 to start reading the selected synchronous pattern from an event corresponding to the first beat timing within the segment. The process writes specification data for repeatedly reproducing the pattern in the pattern write segment WA to a corresponding track. Instead of the shaded portion, the selected pattern is displayed in the pattern write segment WA. On the other hand, if the selected pattern is an asynchronous pattern (NO at E7), the process proceeds to step E9 to write specification data for reproducing the asynchronous pattern only once from a start timing (start point in the pattern write segment WA) to a corresponding track. Instead of the shaded portion, the selected pattern is displayed in the pattern write segment WA.

If not detecting an operation to select a pattern for the pattern write segment WA (NO at E6), the process proceeds to step E10 after steps E8 and E9 to determine whether or not there is an instruction issued to create music data. The music data is formatted to be capable of being commonly reproduced on a plurality of portable terminals. If an instruction is issued to create the music data, the process proceeds to step E11 to perform the performance pattern expansion process (FIG. 14), then to step E12. Otherwise, the process directly proceeds to step E12.

At step E12, the process reproduces the music data, sends it to the outside, etc. according to the instruction. If there is an instruction to stop the music creation application software, the music creation (editing) process terminates. If such stop instruction is not issued, the process returns to step E1 and repeats the above-mentioned steps E1 through E12 until the stop instruction is issued. The music data that can be sent to the outside are only those that contain the transfer flag set to "transferable".

FIG. 14 is a flowchart showing an example of the performance pattern expansion process performed at step E11 (FIG. 13) of the music creation (editing) process. This expansion process can be used to obtain event-format music data that can be commonly reproduced on a plurality of types of information devices including portable terminals such as cellular phones. The obtained music data can be used as is on the other information devices that do not store various performance patterns.

When this process flow starts, the process converts all synchronous pattern tracks into event-sequence format data to create event-sequence format track data corresponding to a synchronous pattern track. Namely, the process reads event data from the pattern according to the specification data on the synchronous pattern track to create new timing data. As shown on the top right in FIG. 8, the process records the timing data and the event data as an event sequence.

At step E32, the process creates track data corresponding to the asynchronous pattern track. Asynchronous patterns include WAVE format data and MIDI-like format data. The MIDI-like format data is expanded to an event sequence (as shown on the top right in FIG. 8) like the process at step E31 for the synchronous pattern track. The WAVE format data records specification data for reading WAVE format data in an event sequence expanded in the MIDI-like format according to the form as shown in top right of FIG. 8. The specification data is recorded at a position corresponding to the progress of the performance.

At step E33, the process provides all created track data with the "uneditable" edit flag and the "transferable" transfer flag. Enabling the "uneditable" edit flag prevents the created music data from being edited. It is possible to effectively protect data resulting from the user's creation (editing) process. Enabling the "transferable" transfer flag allows the created music data to be transmitted to external devices. It is possible to effectively use the data on other information devices such as cellular phones.

At step E34, the process reads a WAVE pattern used for the asynchronous pattern track to create a WAVE pack comprising a plurality of WAVE data (see the bottom center in FIG. 8). At step E35, the performance pattern expansion process unifies the plurality of created track data and the wave pack to create one music data (see the left in FIG. 8), then terminates.

As described, according to the first aspect of the present invention, there is provided a music piece reproducing apparatus for a portable terminal having a plurality of control devices (6s: SW1 through SW6, 6a: SW7 through SW12) and a storage means (3, 5) for a plurality of performance patterns, the apparatus characterized by comprising: an allocation means (4, R2 and R3) for allocating a performance pattern to a control device (6s, 6a); and a reproduction means (R6 and R7 in FIG. 10) for reproducing a performance pattern allocated to the control device (6s, 6a) based on an operation for the control device. Further, there is provided a music piece reproducing program used for a portable terminal having a plurality of control devices (6s, 6a) and a storage means (3, 5) for a plurality of performance patterns to perform a procedure comprising: the steps (R2 and R3) of allocating a performance pattern to a control device (6s, 6a); and the steps of (R6 and R7 in FIG. 11) reproducing a performance pattern allocated to the control device based on an operation for the control device (6s, 6a).

The music piece reproducing apparatus according to the present invention is configured so that the storage means stores (3, 5) a plurality of performance patterns for each pack; and the allocation means (4, R2 and R3) allocates performance patterns stored in a selected pack (R2, and R3). The reproduction means (R6 and R7 in FIG. 10) is configured to start reproducing performance patterns at an operation timing (t2, t6) of the control device or a musical timing (ta, tb3) after the operation timing (t1, t3) according to a type of performance patterns allocated to the control device (6s, 6a). Numbers and symbols in the parentheses indicate reference symbols and the like for the corresponding example.

According to the present invention, a performance pattern is allocated to each of switching control devices (6s: SW1 to SW6, 6a: SW7 to SW12) such as numeric keypad keys on a portable terminal such as a cellular phone or the like. The control devices function as pattern allocation/specification switches for reproduction of music pieces on the portable terminal. Operating a given switch reproduces a performance pattern allocated to that switch. Accordingly, a music piece to be reproduced can be easily selected with simple operations.

According to the present invention, a storage means (3, 5) of the portable terminal stores a pack ("pattern pack"), i.e., a minimum storage unit the portable terminal's OS (Operating System) can recognize individually. The pattern pack contains a plurality of performance patterns. Selecting a pack determines performance patterns allocated to the switch. Performance patterns include a "synchronous pattern" and an "asynchronous pattern". The synchronous pattern starts reproduction at a musical timing (ta, tb3) after a switch (6s: SW1 to SW6) is operated at a time point (t1, t3). The asynchronous pattern starts reproduction at a timing (t2, t6) when the other switch (6a: SW7 to SW12) is operated. Consequently, it is possible to enjoy rearranging a multifarious music piece by fast selecting music pieces to be reproduced and reproducing them continuously.

According to the second aspect of the present invention, there is provided a music piece composing apparatus in a portable terminal set having a plurality of control devices (6s: SW1 through SW6, 6a: SW7 through SW12) and a storage means (3, 5) for a plurality of performance patterns, the apparatus characterized by comprising: an allocation means (4, E2 and E3) for allocating a performance pattern to an operation device (6s, 6a); a timing specification means (E5) for specifying a timing (ts1, ts2, and so on; ta1, ta2, and so on); and a pattern sequence creation means (E8 and E9) for creating a pattern sequence to specify that a performance pattern allocated to the operation device be reproduced at a specified timing based on an operation of the operation device (6s, 6a). Further, there is provided a music piece editing program used for a portable terminal having a plurality of operation devices (6s, 6a) and a storage means (3, 5) for a plurality of performance patterns to perform a procedure comprising: the step (E2 and E3) of allocating a performance pattern to an operation device (6s, 6a); and the step (E5) of specifying a timing (ts1, ts2, and so on; ta1, ta2, and so on); and the step (E8 and E9) of creating a pattern sequence (FIG. 7) to specify that a performance pattern allocated to the operation device be reproduced at a specified timing based on an operation of the operation device (6s, 6a).

The music piece composing apparatus according to this aspect is configured so that the pattern sequence (FIG. 7) specifies to start reproducing a performance pattern allocated to an operation device (6s) at a specified musical timing (ts1, ts2, and so on) from an event corresponding to the timing; and that the pattern sequence specifies to start reading a performance pattern allocated to an operation device (6a) at a specified timing (ta1, ta2, and so on) from the beginning.

The music piece composing apparatus according to this aspect is configured to further comprise: a pack change means (E4), wherein the storage means (3, 5) stores a plurality of performance patterns for each pack; the allocation means (4, E2 and E3) allocates performance patterns in a selected pack; and the pack change means (E4) changes a pack used for a pattern sequence (FIG. 7) created by the pattern sequence creation means (E8 and E9).

According to the third aspect of the present invention, there is provided a music piece composing apparatus in a portable terminal set having a plurality of operation devices (6s: SW1 through SW6, 6a: SW7 through SW12) and a storage means (3, 5) for a plurality of performance patterns, the apparatus characterized by comprising: a pattern sequence creation means (E8 and E9) for creating a pattern sequence (FIG. 7) to specify that a performance pattern allocated to an operation device (6s, 6a) be reproduced sequentially at a specified timing (ts1, ts2, and so on; ta1, ta2, and so on); and a data format change means (E11) for changing a created pattern sequence to event-format music piece data (FIG. 8) commonly reproducible on a plurality of information devices. Further, there is provided a music piece editing program used for a portable terminal having a plurality of operation devices (6s, 6a) and a storage means (3, 5) for a plurality of performance patterns to perform a procedure comprising: the step (E8 and E9) of creating a pattern sequence (FIG. 7) to specify that a performance pattern allocated to an operation device (6s, 6a) be reproduced sequentially at a specified timing (ts1, ts2, and so on; ta1, ta2, and so on); and the step (E11) of changing a created pattern sequence to event-format music piece data (FIG. 8) commonly reproducible on a plurality of information devices.

The music piece composing apparatus according to this aspect is configured so that the data format change means (E11) provides changed music piece data with transferable information (transfer flag set to transferable) indicating that the music piece data can be transferred to other information devices; and that the data format change means provides changed music piece data with uneditable information with an edit flag set to uneditable indicating that the music piece data cannot be edited. Numbers and symbols in the parentheses indicate reference symbols and the like for the corresponding example.

According to the present invention, a performance pattern is allocated to each of switching operation devices (6s: SW1 to SW6, 6a: SW7 to SW12) such as numeric keypad keys on a portable terminal such as a cellular phone or the like. The operation devices function as pattern allocation/specification switches for creation (editing) of music pieces on the portable terminal. According to the first aspect, a timing (ts1, ts2, and so on; ta1, ta2, and so on) is specified, and a switch (6s, 6a) is operated to select a performance pattern. This creates a pattern sequence (FIG. 7) comprising data (pattern numbers) that specify selected patterns and are arranged in the reproduction order. Consequently, it is possible to create a music piece with easy operations. Since performance patterns are selected by means of ten keypad keys provided on the portable terminal, the conventional operability is inherited to allow a user to be easily accustomed to editing operations.

The pattern sequence (FIG. 7) created by the music piece composing apparatus according to the present invention for portable terminals may contain synchronous patterns or asynchronous patterns. When a performance pattern allocated to the operation device (6s) contains synchronous patterns, specification data is recorded to start reproducing a pattern at a musical timing (ts1, ts2, and so on) from an event corresponding to the timing. The reproduction of synchronous patterns starts only from musical timings. When a performance pattern allocated to the operation device (6a) contains asynchronous patterns, specification data is recorded to start reproducing a pattern at any timing (ta1, ta2, and so on) from the beginning. The reproduction of asynchronous patterns starts at any timing. Consequently, it is possible to easily create a multifarious music piece by changing the type of performance patterns.

According to the present invention, a storage means (3, 5) stores a pack ("pattern pack"), i.e., a minimum storage unit the portable terminal's OS (Operating System) can recognize individually. Selecting a pack determines performance patterns allocated to the switch and provides a pack change means (E4). Selecting intended performance patterns from the selected pack creates a pattern sequence (FIG. 7) comprising arranged pattern specification data (pattern numbers) that specify the performance patterns to be reproduced. When the pack change means (E4) is used to change the pack (number) of the already created pattern sequence (FIG. 7), it is possible to change the contents of the pattern sequence to a different music piece without changing the pattern specification data (pattern numbers). Namely, just changing the pack type can transform the existing performance pattern arrangement into a new music piece. It is possible to contribute to creation of a multifarious music piece and promote an interest in creating music pieces.

According to the present invention, there is created a pattern sequence (FIG. 7) composed of pattern specification data (pattern numbers) arranged in the reproduction order corresponding to specified timings (ts1, ts2, and so on; ta1, ta2, and so on). Each pattern specification data specifies a performance pattern selected by an operation of the switch (6s, 6a). The pattern sequence is changed to music piece data (FIG. 8) according to the specification of the pattern specification data (pattern numbers). The music piece data is sequentially expanded from performance patterns recorded in the portable terminal's storage means (3, 5). The music piece data is event-format data that can be reproduced commonly on a plurality of information devices including portable terminals such as cellular phones. Accordingly, the music piece data can be used as is on the other information devices that do not store various performance patterns.

The obtained music piece data contains transferability information (transfer flag or transfer bit) set to be transferable and is allowed to be transferred to the other information devices such as cellular phones. Namely, original data before editing such as a performance pattern is often set to be untransferable. When the edited music piece data is changed to be transferable, it can be effectively used for the other information devices.

In addition, the obtained music piece data contains editability information (edit flag or transfer bit) set to be uneditable and is disabled from being edited. Namely, original data before editing such as a performance pattern is often set to be editable. When the edited music piece data is changed to be uneditable, user-created personal data can be protected effectively.

VARIOUS EMBODIMENTS

While there has been described one example of the present invention, various embodiments are applicable. For example, allocation of performance patterns to the switches (SW1 through SW12) is predetermined in the example. It may be preferable to provide a means for setting performance patterns to the switches and allow a user to customize the allocation.

Further, it may be preferable to allocate a plurality of performance patterns to one switch. In this case, it is convenient to sequentially select the plurality of allocated patterns each time the switch is operated, for example.

The means for determining the types of performance patterns (synchronous patterns and asynchronous patterns) is not limited to the pattern numbers. It is also possible to use any method that can determine the types of performance patterns. For example, there may be methods of recording type data representing the type for each pattern or referencing a pattern recording format from the application to determine the pattern type.

A performance pattern is as long as one bar, but may be shorter or longer that it. While each pattern is specified to be the same length, different pattern lengths may be available.

There may be a case of operating the switch allocated with a pattern that cannot be written to the specified track. For example, when the track for synchronous patterns (display column TS1 or TS2) is selected during the music creation, a user presses any of switches SW7 through SW12 allocated with asynchronous patterns. In such case, it is possible to ignore the switch operation or automatically write the pattern to a writable track other than the specified track.

When the asynchronous pattern display column (TA) is used to create tracks, it may be preferable to provide two such display columns for a track comprising event sequences and a track comprising specification data.

As mentioned above, the present invention allocates a performance pattern to each of switches such as numeric keypad keys provided on a portable terminal such as a cellular phone and allows these switches to function as "pattern allocation/specification switches". Operating a given switch reproduces a performance pattern allocated to the operated switch. Accordingly, it is possible to fast switch between music pieces to be reproduced with an easy operation.

According to the present invention, the storage means of the portable terminal contains a plurality of performance patterns for each pack, i.e., a minimum storage unit the portable terminal OS can identify individually. Selecting the pack determines a performance pattern allocated to the switch. Performance patterns include "synchronous patterns" and "asynchronous patterns". A synchronous pattern starts being reproduced at the musical timing (ta, tb3) after the timing (t1, t3) when the switch (6s) is operated. An asynchronous pattern starts being reproduced at the timing (t2, t6) when the switch (6a) is operated. Accordingly, a user can enjoy easily creating a multifarious music by fast changing music pieces to be reproduced and continuously reproducing them.

As mentioned above, the present invention allocates a performance pattern to each of switches such as numeric keypad keys provided on a portable terminal such as a cellular phone and allows these switches to function as "pattern allocation/specification switches". A timing is specified and a switch is operated to select a performance pattern. This creates a pattern sequence of data arranged in the reproduction order for specifying the selected performance patterns. Consequently, it is possible to create a music piece with easy operations. Since performance patterns are selected by means of ten keypad keys provided on the portable terminal, the conventional operability is inherited to allow a user to be easily accustomed to editing operations.

A created pattern sequence may contain synchronous patterns or synchronous patterns. When performance patterns allocated to the operation device (6s) are synchronous patterns, specification data is recorded to start reproducing a pattern at a musical timing (ts1, ts2, and so on) from an event corresponding to the timing. The reproduction of synchronous patterns is configured to start only from a musical timing. When performance patterns allocated to the operation device (6s) are asynchronous patterns, specification data is recorded to start reading a pattern at a musical timing (ta1, ta2, and so on) from the beginning. The reproduction of asynchronous patterns can start at any timing. Consequently, it is possible to easily create a multifarious music piece by changing the order or the type of performance patterns.

A storage means stores a pack, i.e., a minimum storage unit the portable terminal OS can recognize individually. Selecting a pack determines performance patterns allocated to the switch and provides a pack change means. Therefore, it is possible to select intended performance patterns from the selected pack, define pattern specification data for specifying the performance patterns, and create a pattern sequence. Moreover, it is possible to change the contents of the already created pattern sequence to a different music piece just by using the pack change means to change the pack without changing the pattern specification data. Accordingly, just changing the pack type can transform the existing performance pattern arrangement into a new music piece. It is possible to contribute to creation of a multifarious music piece and promote an interest in creating music pieces.

According to the present invention, there is created a pattern sequence comprising pattern specification data arranged in the reproduction order corresponding to specified timings. Each pattern specification data specifies a performance pattern selected by a switch operation. The pattern sequence is converted to music piece data according to the specification of the pattern specification data. The music piece data is sequentially expanded from performance patterns recorded in the portable terminal's storage means. The music piece data is event-format data that can be reproduced commonly on a plurality of information devices including portable terminals such as cellular phones.

Accordingly, the music piece data can be used as is on the other information devices that do not store various performance patterns.

The music piece data is provided with transferability information set to be transferable to the other information devices. Accordingly, the music piece data can be effectively used for the other information devices. In addition, the music piece data is provided with editability information set to be uneditable. Accordingly, it is possible to effectively protect user-created personal data through a creation (editing) process.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A music reproduction apparatus provided in a portable terminal set having a plurality of controls manually operable for controlling the portable terminal set, comprising:

a first storage that stores a plurality of performance patterns, each performance pattern comprising a sequence of music events and being one of two pattern types: a synchronous pattern that commences after a predetermined time following operation of at least one of said controls and an asynchronous pattern that commences immediately upon operation of at least one of said controls;

an allocating section that allocates the plurality of the performance patterns to the plurality of the controls, a second storage that stores a user-defined composition made of a plurality of user-selected patterns selected using the allocating section;

a first reproducing section responsive to operation of the controls for reproducing the performance patterns allocated to an operated controls;

a composing section that operates based on the selecting of the performance patterns and the setting of timings for composing a sequence of the performance patterns, the sequence being effective to enable the portable terminal set to sequentially reproduce the selected performance patterns at the set timings;

a storing section for storing the composed sequence of performance patterns in the second storage (as the user-defined composition); and a second reproducing section for reproducing the composed sequence of performance patterns in the second storage.

2. The music reproduction apparatus according to claim 1, wherein the storage is divided into blocks and selectably stores a multiple of packs in the respective blocks, each pack comprising a plurality of performance patterns, and wherein the allocating section allocates the performance patterns contained in the pack selected from the storage.

3. A music composition apparatus provided in a portable terminal set having a plurality of controls manually operable for initiating communication using the portable terminal set, comprising:

a first storage that stores a plurality of performance patterns, each performance pattern comprising a sequence of music events and being one of two pattern types: a synchronous pattern that commences after a predetermined time following operation of at least one of said controls and an asynchronous pattern that commences immediately upon operation of at least one of said controls;

an allocating section that allocates the plurality of the performance patterns to the plurality of the controls, a second storage that stores a user-defined composition made of a plurality of user-selected patterns selected using the allocating section a composing section that operates based on the selecting of the performance patterns and setting of timings for composing a sequence of the performance patterns, the sequence being effective to enable the portable terminal set to sequentially reproduce the selected performance patterns at the set timings;

a storing section for storing the composed sequence of performance patterns in the second storage (as the user-defined composition; and a reproducing section for reproducing the composed sequence of performance patterns in the second storage.

4. The music composition apparatus according to claim 3, wherein the storage is divided into blocks and selectably stores a multiple of packs in the respective blocks, each pack comprising a plurality of performance patterns, and wherein the allocating section allocates the performance patterns contained in the pack selected from the storage such that the composing section composes the sequence of the performance patterns contained in the selected pack, the music composition apparatus further comprising a pack changing section that can change the selected pack to another pack such that the performance patterns of the selected pack involved in the composed sequence are replaced by corresponding performance patterns of said another pack while maintaining the settings of the timings.

5. A music reproduction method applicable to a portable terminal set having a plurality of controls manually operable to control the portable terminal set, the method comprising the steps of:

storing a plurality of performance patterns in a storage, each performance pattern comprising a sequence of music events and being one of two pattern types: a synchronous pattern that commences after a predetermined time following operation of at least one of said controls and an asynchronous pattern that commences immediately upon operation of at least one of said controls;

allocating the plurality of the performance patterns to the plurality of the controls;

responding to the operation of the controls for reproducing the performance patterns allocated to the operated controls, composing a sequence of the performance patterns based on selecting of the performance patterns by manipulating said plurality of controls and setting of timings, the sequence being effective to enable the portable terminal set to sequentially reproduce the selected performance patterns at the set timings;

storing the composed sequence of performance patterns in a second storage as a user-defined composition; and reproducing the composed sequence of performance patterns in the second storage.

6. A music composition method applicable to a portable terminal set having a plurality of controls manually operable to initiate communication using the portable terminal set, the method comprising the steps of:

storing a plurality of performance patterns in a storage;

allocating the plurality of the performance patterns to the plurality of the controls, such that the controls can be operated for selecting the performance patterns;

setting timings of reproducing the performance patterns while operating the controls; and composing a sequence of the performance patterns based on the selecting of the performance patterns and the setting of the timings, the sequence being effective to enable the portable terminal set to sequentially reproduce the selected performance patterns at the set timings, a composing section that operates based on the selecting of the performance patterns and setting of timings for composing a sequence of the performance patterns, the sequence being effective to enable the portable terminal set to sequentially reproduce the selected performance patterns at the set timings;

a storing section for storing the composed sequence of performance patterns in the second storage (as the user-defined composition; and a reproducing section for reproducing the composed sequence of performance patterns in the second storage.

7. A music reproduction program installable in a portable terminal set having a processor and a plurality of controls manually operable to control the portable terminal set, the program being executable by the processor to carry out a method comprising the steps of:

storing a plurality of performance patterns in a storage, each performance pattern comprising a sequence of music events and being one of two pattern types: a synchronous pattern that commences after a predetermined time following operation of at least one of said controls and an asynchronous pattern that commences immediately upon operation of at least one of said controls;

allocating the plurality of the performance patterns to the plurality of the controls;

responding to the operation of the controls for reproducing the performance patterns allocated to the operated controls;

composing a sequence of the performance patterns based on selecting of the performance patterns by manipulating said plurality of controls and setting of timings, the sequence being effective to enable the portable terminal set to sequentially reproduce the selected performance patterns at the set timings;

storing the composed sequence of performance patterns in a second storage as a user-defined composition; and reproducing the composed sequence of performance patterns in the second storage.

8. A music composition program executable in a portable terminal set having a processor and a plurality of controls manually operable to initiate communication using the portable terminal set, the program being executable by the processor to carry out a method comprising the steps of:

storing a plurality of performance patterns in a storage;

allocating the plurality of the performance patterns to the plurality of the controls, such that the controls can be operated for selecting the performance patterns;

setting timings of reproducing the performance patterns while operating the controls; and composing a sequence of the performance patterns based on the selecting of the performance patterns and the setting of the timings, the sequence being effective to enable the portable terminal set to sequentially reproduce the selected performance patterns at the set timings, a composing section that operates based on the selecting of the performance patterns and setting of timings for composing a sequence of the performance patterns, the sequence being effective to enable the portable terminal set to sequentially reproduce the selected performance patterns at the set timings;

a storing section for storing the composed sequence of performance patterns in the second storage as the user-defined composition; and a reproducing section for reproducing the composed sequence of performance patterns in the second storage.

9. The music reproduction apparatus according to claim 1, wherein the first storage stores the asynchronous pattern which contains data representing a sound waveform.

10. The music composition apparatus according to claim 3, wherein the storage stores the asynchronous pattern which contains data representing a sound waveform.

11. A music reproduction apparatus provided in a portable terminal set having a plurality of controls manually operable for controlling the portable terminal set, comprising:

a storage that stores a plurality of performance patterns, each performance pattern comprising a sequence of music events and being one of two pattern types: a synchronous pattern that commences after a predetermined time following operation of at least one of said controls and an asynchronous pattern that commences immediately upon operation of at least one of said controls;

an allocating section that allocates the plurality of the performance patterns to the plurality of the controls;

a first reproducing section responsive to operation of a control to which a performance pattern having the pattern type of synchronous pattern is allocated for reproducing the allocated performance pattern after a predetermined time following the operation of the control; and a second reproducing section responsive to operation of another control to which another performance pattern having the pattern type of asynchronous pattern is allocated for reproducing the allocated performance pattern immediately upon the operation of the control.

12. A music reproduction program provided in a portable terminal set having a processor and a plurality of controls manually operable for controlling the portable terminal set, the program being executable by the processor to carry out a method comprising the steps of:

storing a plurality of performance patterns, each performance pattern comprising a sequence of music events and being one of two pattern types: a synchronous pattern that commences after a predetermined time following operation of at least one of said controls and an asynchronous pattern that commences immediately upon operation of at least one of said controls;

allocating the plurality of the performance patterns to the plurality of the controls;

responding to operation of a control to which a performance pattern having the pattern type of synchronous pattern is allocated for reproducing the allocated performance pattern after a predetermined time following the operation of the control; and responding to operation of another control to which another performance pattern having the pattern type of asynchronous pattern is allocated for reproducing the allocated performance pattern immediately upon the operation of the control.

13. A music reproduction method applicable to a portable terminal set having a plurality of controls manually operable to control the portable terminal set, the method comprising the steps of:

storing a plurality of performance patterns, each performance pattern comprising a sequence of music events and being one of two pattern types: a synchronous pattern that commences after a predetermined time following operation of at least one of said controls and an asynchronous pattern that commences immediately upon operation of at least one of said controls;

allocating the plurality of the performance patterns to the plurality of the controls;

responding to operation of a control to which a performance pattern having the pattern type of synchronous pattern is allocated for reproducing the allocated performance pattern after a predetermined time following the operation of the control; and responding to operation of another control to which another performance pattern having the pattern type of asynchronous pattern is allocated for reproducing the allocated performance pattern immediately upon the operation of the control.

* * * * *